US012661796B2

(12) United States Patent
Murase et al.

(10) Patent No.: US 12,661,796 B2
(45) Date of Patent: Jun. 23, 2026

(54) HAND AND ROBOT SYSTEM

(71) Applicant: KAWASAKI JUKOGYO KABUSHIKI KAISHA, Kobe (JP)

(72) Inventors: Yohei Murase, Kobe (JP); Hiroaki Fukuda, Kobe (JP); Tamami Oryu, Kobe (JP); Hisao Wada, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 258 days.

(21) Appl. No.: 18/573,014

(22) PCT Filed: Jun. 10, 2022

(86) PCT No.: PCT/JP2022/023484
§ 371 (c)(1),
(2) Date: Dec. 21, 2023

(87) PCT Pub. No.: WO2023/276613
PCT Pub. Date: Jan. 5, 2023

(65) Prior Publication Data
US 2024/0293935 A1 Sep. 5, 2024

(30) Foreign Application Priority Data

Jun. 30, 2021 (JP) ................................. 2021-109307

(51) Int. Cl.
*B25J 9/16* (2006.01)
*B25J 15/10* (2006.01)
(52) U.S. Cl.
CPC ............. *B25J 9/1687* (2013.01); *B25J 15/10* (2013.01)

(58) Field of Classification Search
CPC ........ B02J 15/10; B02J 15/083; B02J 15/086; B25J 17/0258; B25J 17/0275
USPC .............................. 414/1, 739, 732; 294/293
See application file for complete search history.

(56) References Cited

U.S. PATENT DOCUMENTS 11,389,951 B2 * 7/2022 Kawabata ............ B25J 15/0009
2012/0296341 A1 11/2012 Seibold et al.
2020/0198157 A1 * 6/2020 Hirata .................... B25J 15/086
(Continued)

FOREIGN PATENT DOCUMENTS

JP      S60-135193 A      7/1985
JP      H04-082689 A      3/1992
JP      H05-285747 A      11/1993
(Continued)

OTHER PUBLICATIONS

Aug. 16, 2022 Search Report issued in International Patent Application No. PCT/JP2022/023484.

*Primary Examiner* — Michael McCullough
*Assistant Examiner* — Jessica L Burkman
(74) *Attorney, Agent, or Firm* — Oliff PLC

(57) ABSTRACT

A hand includes a hand body in which a predetermined first reference axis is defined, a gripper in which a predetermined second reference axis is defined and which grips a workpiece, and a coupler that couples the gripper to the hand body. The coupler includes at least one of a decentering supporter that supports the gripper such that the second reference axis is capable of being decentered with respect to the first reference axis, or a tilt supporter that supports the gripper such that the second reference axis is capable of being tilted with respect to the first reference axis.

26 Claims, 16 Drawing Sheets

(56)                        References Cited

U.S. PATENT DOCUMENTS

2023/0076756 A1 *    3/2023   Stilson ................... B25J 15/106

FOREIGN PATENT DOCUMENTS

| JP | H07-040278 | A |   | 2/1995 |
| JP | 2019155502 | A | * | 9/2019 |

* cited by examiner 130
131 CONTROLLER ROBOT ARM 120
132 STORAGE
133 MEMORY HAND 100

START

S1 GRIP ACTION

S2 CONTACT ACTION

S3 RELEASING ACTION

S4 INTRODUCTION ACTION

S5 INSERTION ACTION

END

HAND AND ROBOT SYSTEM

FIELD

The technique disclosed here relates to hands and robot systems.

BACKGROUND

A hand known to date grips a workpiece to perform work. Patent Document 1, for example, discloses a hand that grips a component and inserts the gripped component into a hole in another component.

CITATION LIST

Patent Document

Patent Document 1: Japanese Patent Application Publication No. H05-285747

SUMMARY

In work of a hand as described above, a positional accuracy of the hand has a significant influence on the work. For example, in the work of inserting a component into a hole, if the positions of the component and the hole are misaligned, the work of inserting the component is difficult. In addition, in the case where the insertion direction of the component is tilted with respect to the axis of the hole, the work of inserting the component is also difficult. This is not limited to the insertion work of components, the same holds for other work such as the work of picking up a component and the work of placing a component at a predetermined place. In view of this, enhancement of positional accuracy of the hand can be effective. However, to enhance positional accuracy of the hand, loads of sensing and control in controlling the position of the hand increase.

It is therefore an object of the technique disclosed here to ease work by a hand.

A hand disclosed here includes: a hand body in which a predetermined first reference axis is defined; a gripper in which a predetermined second reference axis is defined and which grips a workpiece; and a coupler that couples the gripper to the hand body, wherein the coupler includes at least one of a decentering supporter that supports the gripper such that the second reference axis is capable of being decentered with respect to the first reference axis, or a tilt supporter that supports the gripper such that the second reference axis is capable of being tilted with respect to the first reference axis.

A robot system disclosed here includes: a robot arm; a hand coupled to the robot arm; and a controller that controls the robot arm and the hand, wherein the hand includes a hand body in which a predetermined first reference axis is defined, a gripper in which a predetermined second reference axis is defined and which grips a workpiece, and a coupler that couples the gripper to the hand body, the coupler includes at least one of a decentering supporter that supports the gripper such that the second reference axis is capable of being decentered with respect to the first reference axis, or a tilt supporter that supports the gripper such that the second reference axis is capable of being tilted with respect to the first reference axis, and the controller causes the robot arm and the hand to perform insertion work of inserting the workpiece gripped by the hand into a predetermined hole.

The hand described above eases work by the hand. The robot system eases work by a hand.

DESCRIPTION OF EMBODIMENTS

An exemplary embodiment will be specifically described hereinafter with reference to the drawings.

Figure 1:
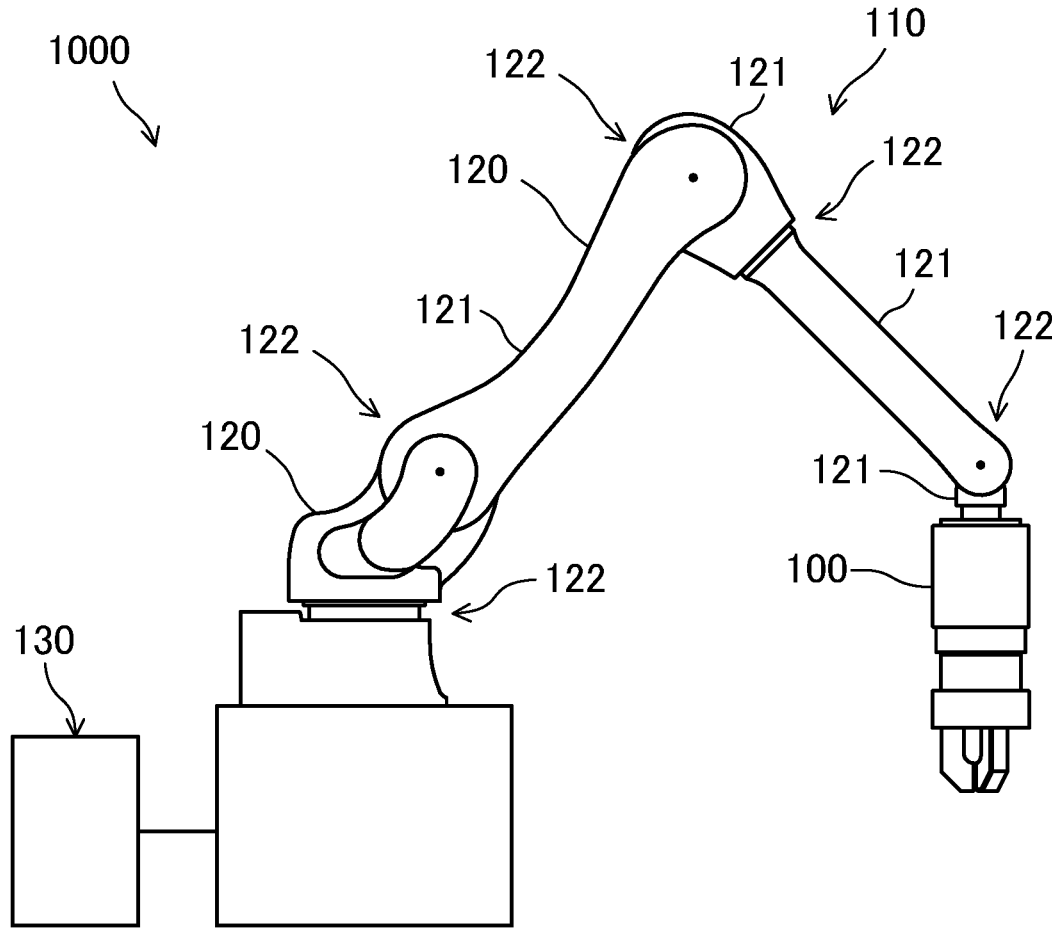
FIG. 1 is a schematic view illustrating a configuration of a robot system.

FIG. 1 is a schematic view illustrating a configuration of a robot system 1000.

The robot system 1000 includes a robot 110 including a robot arm 120 and a hand 100, and a controller 130 that controls the robot arm 120 and the hand 100. The hand 100 is coupled to the robot arm 120 (specifically a distal end of the robot arm 120). The hand 100 grips a workpiece to perform various treatments. For example, the controller 130 causes the robot arm 120 and the hand 100 to perform insertion work of inserting a workpiece gripped by the hand 100 into a predetermined hole. The insertion of the workpiece herein includes press fitting of the workpiece into the hole and screwing of the workpiece into a screw hole.

The robot 110 is, for example, an industrial robot. The robot 110 causes the hand 100 to act, that is, to move by the robot arm 120. The hand 100 is a so-called end effector. The hand 100 grips a workpiece. The hand 100 also regrips the workpiece, combines the workpiece to another workpiece, and so forth.

The robot arm 120 includes links 121, joints 122, and motors. Each of the joints 122 rotatably connects adjacent two of the links 121. Each of the motors rotationally drives the joints 122. Each motor is, for example, a servo motor.

Figure 2:
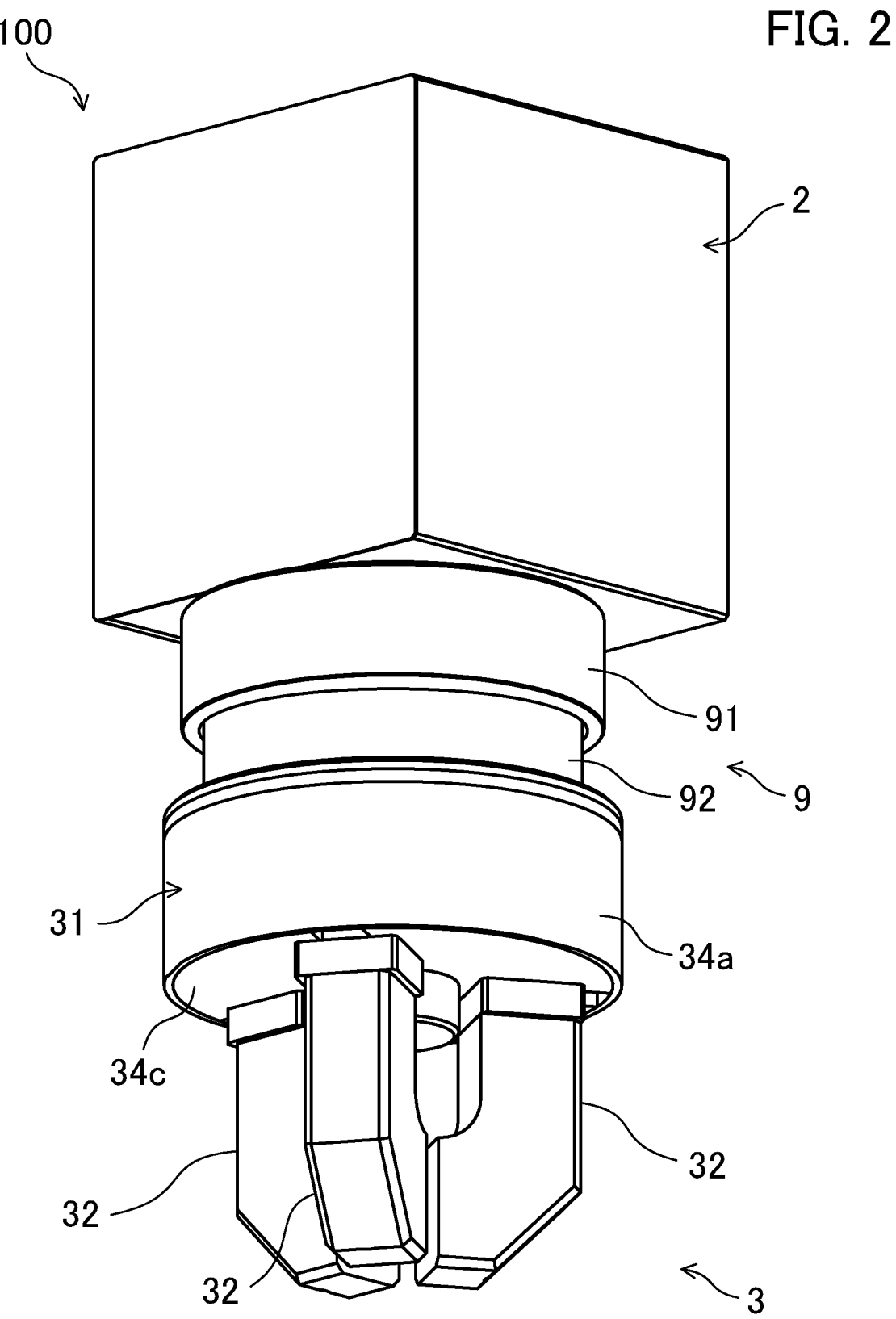
FIG. 2 is a perspective view of a hand.
Figure 3:
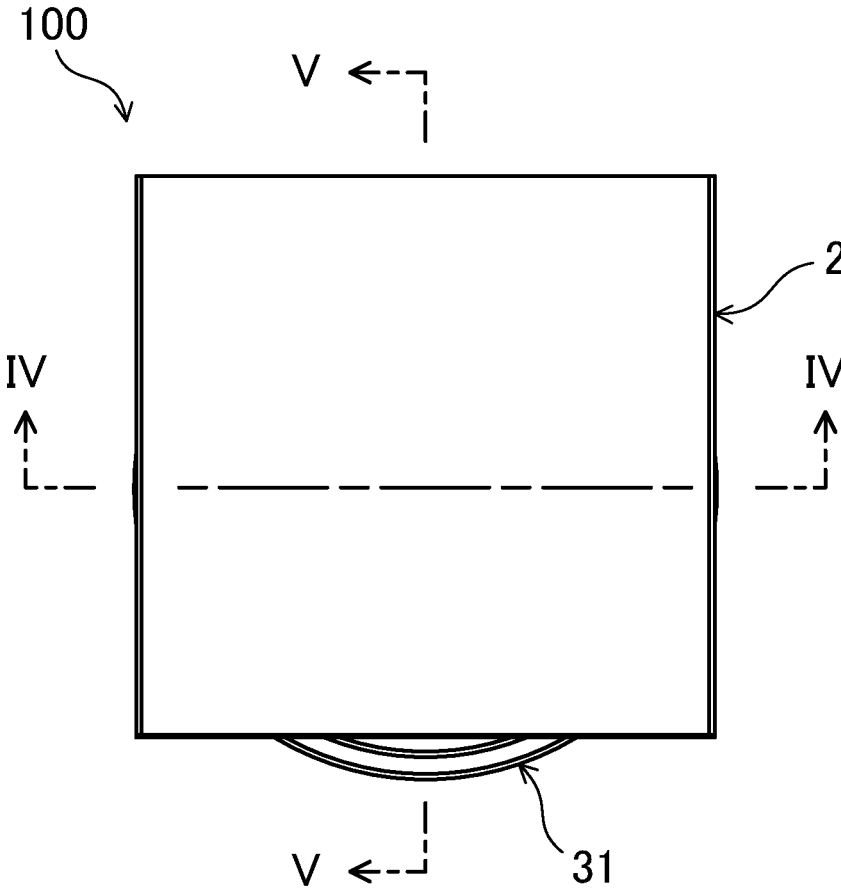
FIG. 3 is a plan view of the hand.
Figure 4:
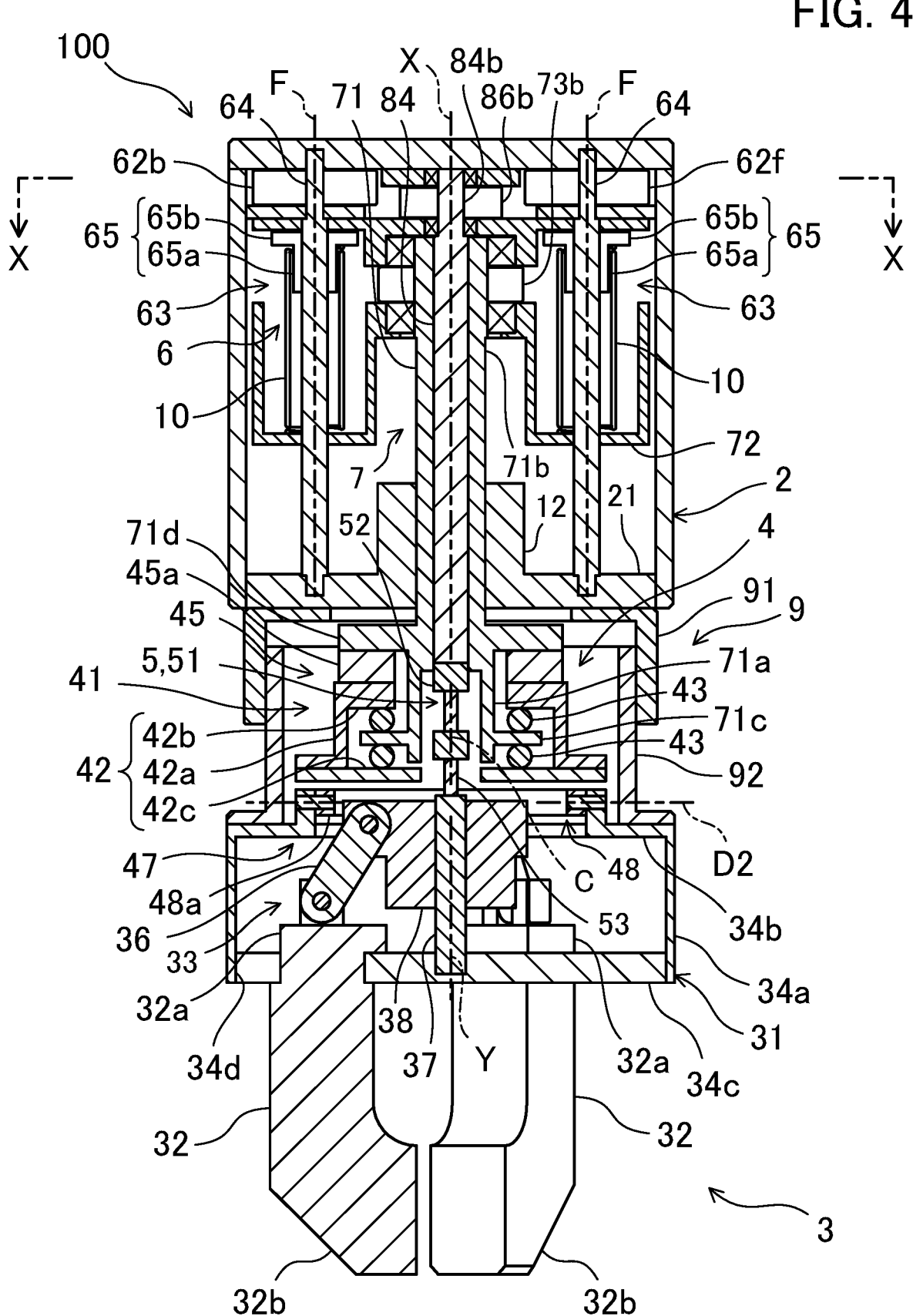
FIG. 4 is a cross-sectional view of the hand taken along line IV-IV in FIG. 3.
Figure 5:
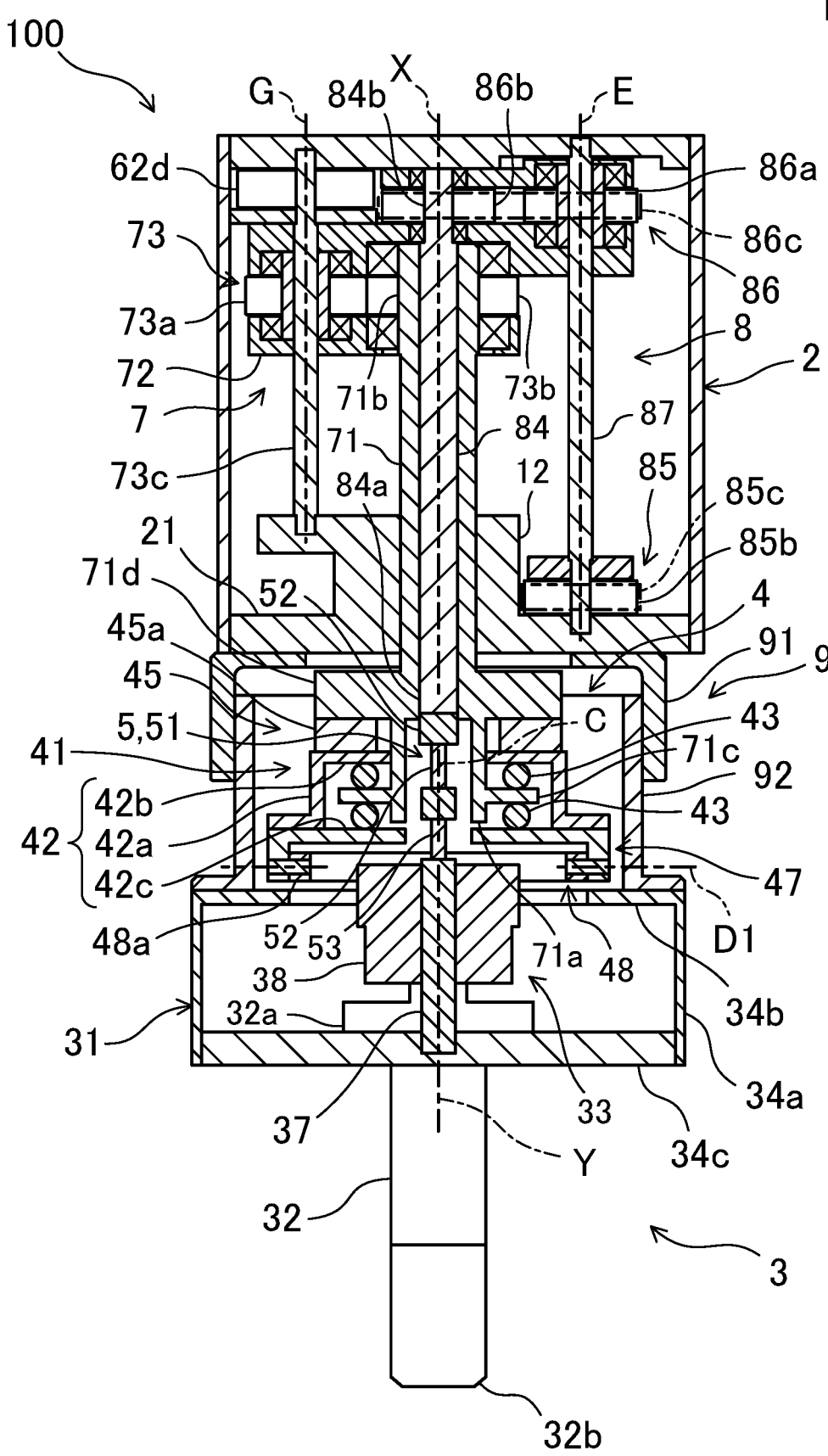
FIG. 5 is a cross-sectional view of the hand taken along line V-V in FIG. 3.

FIG. 2 is a perspective view of the hand 100. FIG. 3 is a plan view of the hand 100. FIG. 4 is a cross-sectional view of the hand 100 taken along line IV-IV in FIG. 3. FIG. 5 is a cross-sectional view of the hand 100 taken along line V-V in FIG. 3. In the drawings, some elements are not shown for easy understanding of the configuration. The same holds for the following drawings.

The hand 100 includes a hand body 2, a gripper 3 that grips a workpiece, and a coupler 4 that couples the gripper 3 to the hand body 2. In the hand body 2, a predetermined first reference axis X is defined. In the gripper 3, a predetermined second reference axis Y is defined. The coupler 4 includes a decentering supporter 41 that supports the gripper 3 such that the second reference axis Y is capable of being decentered with respect to the first reference axis X, and a tilt supporter 47 that supports the gripper 3 such that the second reference axis Y is capable of being tilted with respect to the first reference axis X.

The hand 100 can move the workpiece gripped by the gripper 3 straight in the direction of the first reference axis X while rotating the workpiece about the first reference axis X. Accordingly, the hand 100 inserts the workpiece into a hole or screw the workpiece into a screw hole, for example. A side to which the gripper 3 advances from the hand body 2 along the first reference axis X will be hereinafter referred to as an "advancing side" or a "distal side" and a side to which the gripper 3 retracts toward the hand body 2 along the first reference axis X will be hereinafter referred to as a "retracting side" or a "body side."

The hand 100 further includes a lock 9 that locks movement of the coupler 4, and buffers 10 that absorb a force exerted on the gripper 3 in the direction of the first reference axis X.

As illustrated in FIG. 2, the hand body 2 is a box-shaped casing. The hand body 2 is an approximately rectangular parallelepiped. As illustrated in FIGS. 4 and 5, the hand body 2 includes an opening/closing driver 8 that opens and closes the gripper 3, a rotator 7 that rotates the gripper 3 about the second reference axis Y, and a straight mover 6 that moves the gripper 3 straight in the direction of the first reference axis X with respect to the hand body 2.

—Gripper—

As illustrated in FIG. 4, the gripper 3 includes a base 31, fingers 32 supported by the base 31, and an operator 33 that causes the fingers 32 to perform an opening/closing action. In this example, as illustrated in FIG. 2, the gripper 3 includes three fingers 32.

As illustrated in FIG. 2, the base 31 is approximately tubular. Specifically, as illustrated in FIG. 4, the base 31 has a cylinder 34*a*, a celling 34*b*, and a bottom 34*c*. The cylinder 34*a* has a substantially tubular shape extending along the second reference axis Y serving as a center axis of the cylinder 34*a*. The celling 34*b* is located at one end of the cylinder 34*a* in the direction of the second reference axis Y. The celling 34*b* has a substantially disc shape about the second reference axis Y. The celling 34*b* has an opening substantially at the center thereof. The cylinder 34*a* and the celling 34*b* are shaped as a single unit. The bottom 34*c* is attached to the other end of the cylinder 34*a* in the direction of the second reference axis Y. The bottom 34*c* has a substantially disc shape about the second reference axis Y. The bottom 34*c* is shaped as a separate component from the cylinder 34*a* and the celling 34*b* and attached to the cylinder 34*a*.

The bottom 34*c* has three slits 34*d* penetrating the bottom 34*c* in the thickness direction and extending radially about the second reference axis Y. FIG. 4 shows one slit 34*d*. The slits 34*d* are arranged at regular intervals (i.e., at an interval of 120 degrees) in the circumferential direction about the second reference axis Y.

The fingers 32 are supported by the bottom 34*c* to be slidable along the slits 34*d*. Specifically, each of the fingers 32 has a first end 32*a* supported by the base 31 and a second end 32*b* to contact a workpiece. The first end 32*a* is located at an inner side of the base 31 and slidably engaged with the bottom 34*c*. Accordingly, the fingers 32 are supported by the base 31 to be movable radially about the second reference axis Y. The fingers 32 extend from the base 31 substantially in parallel with the second reference axis Y.

The three fingers 32 are arranged at regular intervals (i.e., at an interval of 120 degrees) in the circumferential direction about the second reference axis Y. The three fingers 32 move toward or away from each other radially about the second reference axis Y to thereby open and close. The fingers 32 grip a workpiece at the second ends 32*b*.

The operator 33 includes links 36 coupled to the fingers 32, a feed screw 37 that extends along the second reference axis Y serving as a center axis of the feed screw 37 and rotates about the second reference axis Y, and a block 38 to which the feed screw 37 is screwed and the links 36 are coupled. The operator 33 is a so-called linkage.

One link 36 is coupled to one finger 32. One end of the link 36 is rotatably coupled to the finger 32 (specifically, the first end 32*a*).

The feed screw 37 and the block 38 define a so-called screw feeder. The feed screw 37 is located in the base 31. The feed screw 37 extends along the second reference axis Y serving as a center axis of the feed screw 37, and is supported by the bottom 34*c* to be rotatable about the second reference axis Y.

The links 36 are coupled to the block 38. Specifically, an end of each link 36 opposite to an end coupled to the finger 32 is rotatably coupled to the block 38. That is, one end of each link 36 is coupled to the finger 32, and the other end of the link 36 is coupled to the block 38. The fingers 32 are located in the slits 34*d* and do not rotate about the second reference axis Y with respect to the base 31. Accordingly, the block 38 coupled to the three fingers 32 through the links 36 does not rotate about the second reference axis Y with respect to the base 31, either.

When the feed screw 37 rotates, the block 38 moves in the direction of the second reference axis Y. When the block 38 moves in the direction of the second reference axis Y, the links 36 move cooperatively, and accordingly, the fingers 32 move radially about the second reference axis Y. When the block 38 approaches the bottom 34*c*, the fingers 32 move radially outward. On the other hand, when the block 38 moves away from the bottom 34*c*, the fingers 32 move radially inward.

—Coupler—

Figure 6:
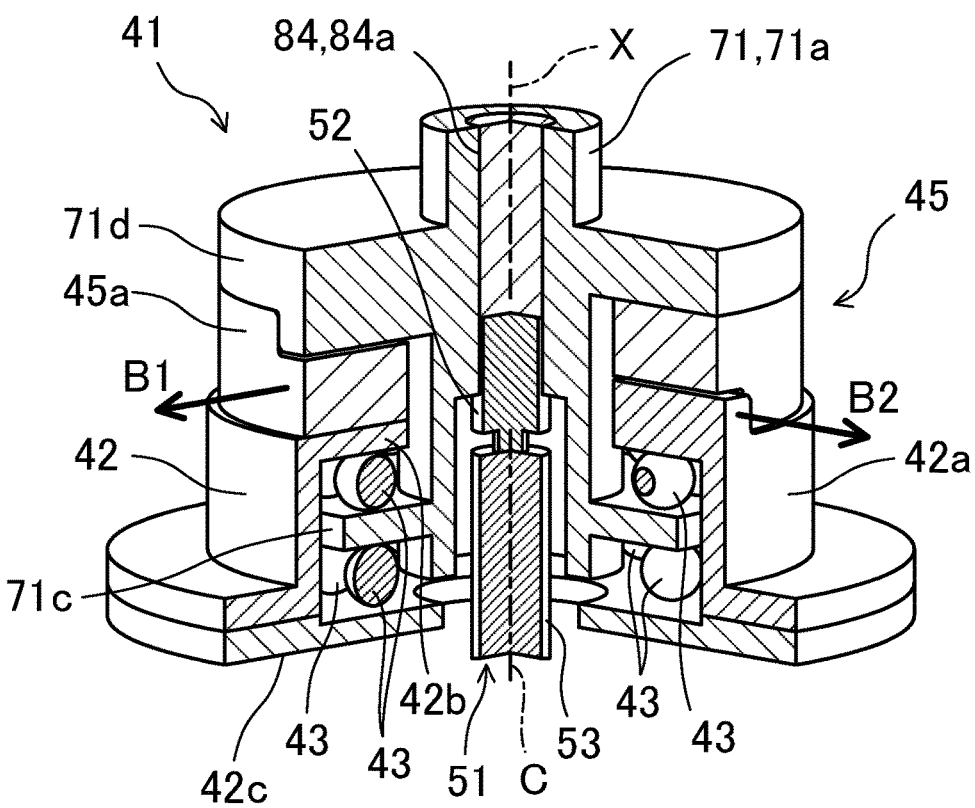
FIG. 6 is a perspective cross-sectional view of a decentering supporter.

The coupler 4 couples the base 31 to the hand body 2. As illustrated in FIG. 4, the coupler 4 is coupled to the rotator 7 of the hand body 2. Specifically, the coupler 4 includes the decentering supporter 41 that supports the gripper 3 such that the gripper 3 is capable of being decentered with respect to the first reference axis X, and the tilt supporter 47 that supports the gripper 3 such that the gripper 3 is capable of being tilted with respect to first reference axis X. FIG. 6 is a perspective cross-sectional view of the decentering supporter 41.

The decentering supporter 41 is coupled to the rotator 7. The rotator 7 includes a rotation shaft 71 extending along the first reference axis X serving as a center axis of the rotator 7, which will be described later in detail. A flange-shaped first disc 71*c* and a second disc 71*d* each expanding in a plane orthogonal to the first reference axis X are located at a first end 71*a* that is one of two ends of the rotation shaft 71 closer to the coupler 4 than the other end. The first disc 71*c* is located closer to the distal side of the first end 71*a* than the second disc 71*d* is. The decentering supporter 41 is coupled to the first end 71*a* of the rotation shaft 71.

The decentering supporter 41 includes a decentered body 42 coupled to the rotation shaft 71 such that the decentered body 42 is movable in a direction orthogonal to the first reference axis X. The decentered body 42 includes a substantially tubular cylinder 42*a*, a substantially disc-shaped celling 42*b*, and a substantially disc-shaped bottom 42*c*. The decentered body 42 has a substantially tubular box shape as a whole. The cylinder 42*a*, the celling 42*b*, and the bottom 42*c* are coaxially arranged. That is, the cylinder 42*a* extends along an axis C serving as a center axis of the cylinder 42*a*, and the axis of each of the celling 42*b* and the bottom 42*c* is also the axis C. The celling 42*b* has an opening substantially at the center thereof. The bottom 42*c* has an opening substantially at the center thereof. The decentered body 42 houses the first disc 71*c* of the rotation shaft 71. That is, the rotation shaft 71 penetrates the opening of the celling 42*b*, and the first disc 71*c* is located between the celling 42*b* and the bottom 42*c*. The first disc 71*c* is parallel to each of the celling 42*b* and the bottom 42*c*. That is, the axis C is parallel to the first reference axis X. Rolling elements 43 are arranged circumferentially about the first reference axis X between the celling 42*b* and the first disc 71*c*. Similarly, rolling elements 43 are arranged circumferentially about the first reference axis X between the bottom 42*c* and the first disc 71*c*. In this example, the rolling elements 43 are balls. Rolling of the rolling elements 43 allows the decentered body 42 to move in a direction orthogonal to the first reference axis X with respect to the rotation shaft 71. At this time, the decentered body 42 moves in parallel with a direction orthogonal to the first reference axis X while keeping the posture (i.e., maintaining the parallel relationship between the axis C and the first reference axis X). The decentered body 42 can move in parallel within a range in which the cylinder 42*a* contacts the first disc 71*c*. It should be noted that the decentered body 42 cannot move in the direction of the first reference axis X with respect to the rotation shaft 71.

The gripper 3 is coupled to the decentered body 42 through the tilt supporter 47. Accordingly, the gripper 3 can also move in the direction orthogonal to the first reference axis X with respect to the rotation shaft 71 together with the decentered body 42.

The decentering supporter 41 also includes a second coupling 45. The second coupling 45 coupes the rotation shaft 71 and the gripper 3. The second coupling 45 is a coupling that couples two decentered parallel axes, and transfers rotation between the two decentered axes. In this example, the second coupling 45 transfers rotation of the rotation 71 to the gripper 3 with the second reference axis Y decentered with respect to the first reference axis X. In this example, the second coupling 45 is a so-called Oldham coupling.

Specifically, as illustrated in FIG. 6, the second coupling 45 includes a second disc 71*d* as a first hub, an insert 45*a*, and a decentered body 42 as a second hub. The decentered body 42, the insert 45*a*, and the second disc 71*d* are arranged in this order from the base 31 in the direction of the first reference axis X. The second disc 71*d* is integrated with the rotation shaft 71 (specifically, the first end 71*a*). The second disc 71*d* and the insert 45*a* are coupled to each other to be movable in a first direction B1 orthogonal to the first reference axis X. The insert 45*a* and the decentered body 42 are coupled to each other to be movable in the second direction B2 orthogonal to the first reference axis X and to the first direction B1. That is, the decentered body 42 is movable with respect to the second disc 71*d* within a plane orthogonal to the first reference axis X. At this time, the decentered body 42 moves in parallel with a direction orthogonal to the first reference axis X without changing the posture. It should be noted that the decentered body 42 cannot rotate about the first reference axis X with respect to the second disc 71*d*.

The rotation shaft 71 penetrates the insert 45*a* and enters the inside of the decentered body 42. The second disc 71*d* rotates integrally with the rotation shaft 71. When the second disc 71*d* rotates about the first reference axis X, the decentered body 42 rotates together with the second disc 71*d* because the decentered body 42 is non-rotatable with respect to the second disc 71*d*. At this time, in a case where the axis C of the decentered body 42 is decentered with respect to the first reference axis X, the decentered body 42 rotates while moving in parallel relative to the rotation shaft 71 in a direction orthogonal to the first reference axis X so that the decentered body 42 thereby rotates about the axis C while keeping a positional relationship between the axis C and the first reference axis X. That is, rotation about the first reference axis X input to the second disc 71*d* is output to the decentered body 42 as rotation about the axis C decentered with respect to the first reference axis X. Since the gripper 3 is coupled to the decentered body 42, when the decentered body 42 rotates, the gripper 3 rotates together with the decentered body 42.

Figure 7:
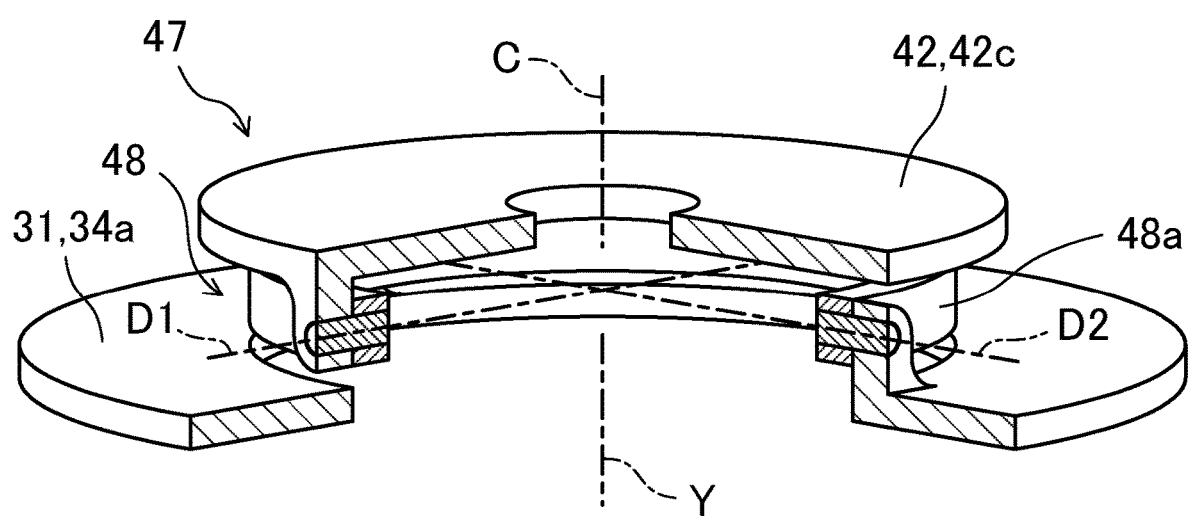
FIG. 7 is a perspective cross-sectional view of a tilt supporter.

FIG. 7 is a perspective cross-sectional view of the tilt supporter 47. The tilt supporter 47 includes a third coupling 48. The third coupling 48 couples the rotation shaft 71 and the gripper 3 to each other. The third coupling 48 is a coupling that couples two axes that tilt relative to each other (i.e., two axes with angular misalignment) and transfers rotation between two axes that tilt relative to each other. In this example, the third coupling 48 transfers rotation of the rotation shaft 71 to the gripper 3 with the second reference axis Y tilted with respect to the first reference axis X. That is, the tilt supporter 47 not only couples the gripper 3 to the rotation shaft 71 such that the gripper 3 is capable of being tilted with respect to the rotation shaft 71, but also transfers rotation of the rotation shaft 71 to the gripper 3 with the second reference axis Y tilted with respect to the first reference axis X. In this example, the third coupling 48 couples the rotation shaft 71 and the gripper 3 to each other with interposition of the decentering supporter 41.

The third coupling 48 includes a coupling element 48*a*. The coupling element 48*a* has a substantially ring shape. The coupling element 48*a* has a first rotation axis D1 and a second rotation axis D2 extending in directions approximately orthogonal to each other. In this example, the first rotation axis D1 and the second rotation axis D2 are present in the same plane, and the first rotation axis D1 and the second rotation axis D2 are approximately orthogonal to each other. The decentered body 42 is coupled to the coupling element 48a to be rotatable about the first rotation axis D1. More specifically, the bottom 42c of the decentered body 42 is coupled to the coupling element 48a. The first rotation axis D1 is orthogonal to the axis C of the decentered body 42. In addition, the base 31 is coupled to the coupling element 48a to be rotatable about the second rotation axis D2. More specifically, the cylinder 34a of the base 31 is coupled to the coupling element 48a. The second rotation axis D2 is orthogonal to the second reference axis Y of the gripper 3.

The coupling element 48a is freely rotatable about the first rotation axis D1 with respect to the decentered body 42, and the base 31 is freely rotatable about the second rotation axis D2 with respect to the coupling element 48a. Accordingly, the gripper 3 is capable of being tilted with respect to the axis C of the decentered body 42. The third coupling 48 is a so-called universal coupling, more specifically, a cross coupling.

An action of the thus-configured coupler 4 will be described.

First, an action of the decentering supporter 41 will be described. When a force of moving the hand body 2 and the gripper 3 in a direction orthogonal to the first reference axis X is applied to at least one of the hand body 2 or the gripper 3, the decentered body 42 moves in a direction orthogonal to the first reference axis X with respect to the rotation shaft 71 by rolling of the rolling elements 43. At the same time, the insert 45a moves in the first direction B1 relative to the second disc 71d, and the decentered body 42 as a second hub moves in the second direction B2 relative to the insert 45a. With the movement of the decentered body 42, the decentered body 42 moves relative to the hand body 2 such that the axis C is decentered with respect to the first reference axis X. The gripper 3 coupled to the decentered body 42 moves relative to the hand body 2 such that the second reference axis Y is decentered with respect to the first reference axis X.

Figure 8:
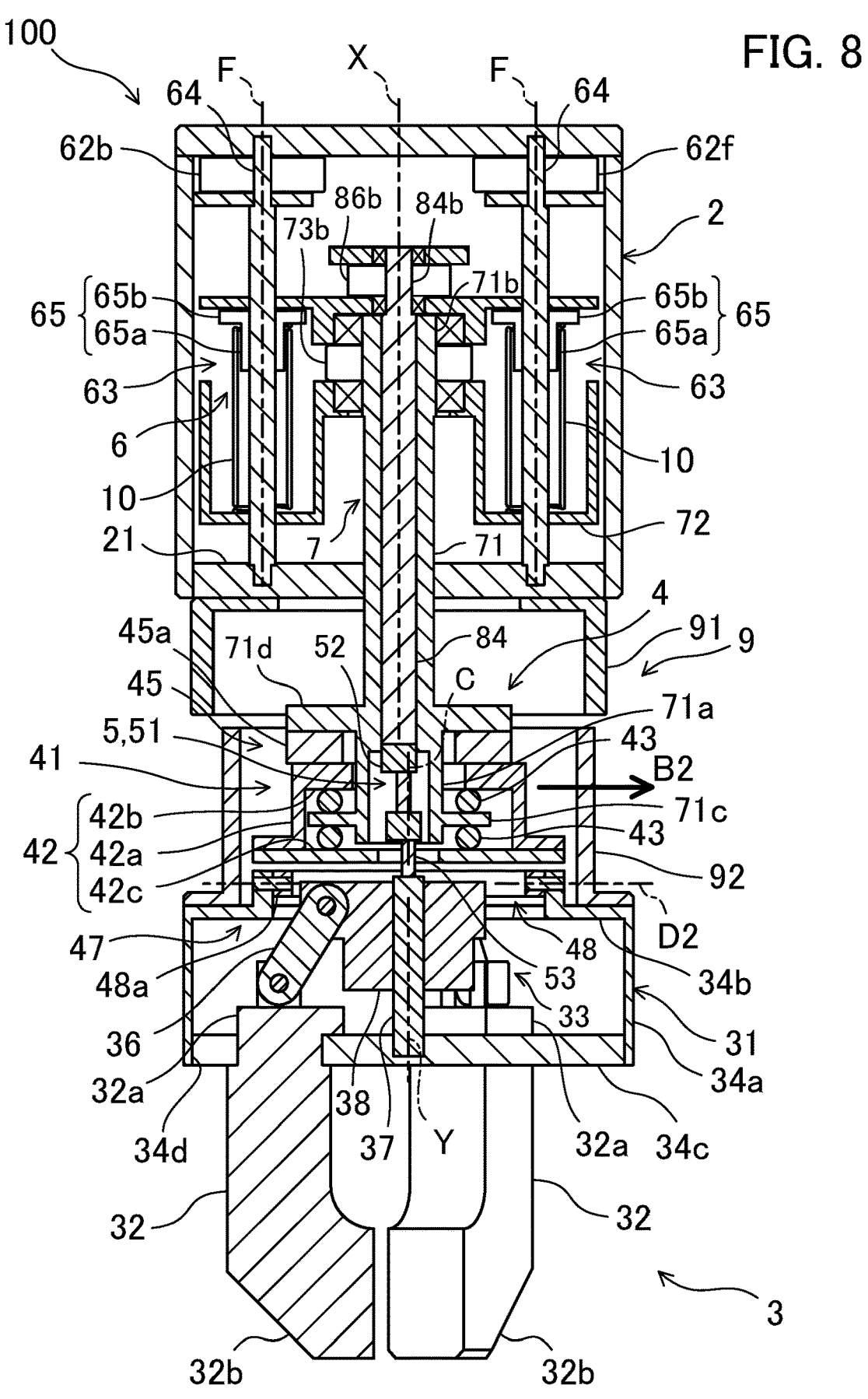
FIG. 8 is a cross-sectional view of the hand illustrating a state where a gripper has moved in a second direction relative to a hand body.

FIG. 8 is a cross-sectional view of the hand 100 illustrating a state where the gripper 3 has moved in the second direction B2 relative to the hand body 2. The decentered body 42 has moved in the second direction B2 in parallel with the insert 45a. Accordingly, the gripper 3 coupled to the decentered body 42 has also moved in the second direction B2 in parallel with the insert 45a. As a result, the second reference axis Y of the gripper 3 is decentered with respect to the first reference axis X of the hand body 2.

Similarly, the insert 45a can move in the first direction B1 in parallel with the second disc 71d. Accordingly, the gripper 3 coupled to the second disc 71d through the insert 45a can also move in the first direction B1 in parallel with the second disc 71d. Such parallel movement of the gripper 3 in the first direction B1 and the parallel movement of the gripper 3 in the second direction B2 occur in combination so that the gripper 3 thereby moves in parallel in any direction orthogonal to the first reference axis X and is decentered with respect to the first reference axis X.

In a case where the gripper 3 is fixed and the hand body 2 moves relative to the gripper 3, the hand body 2 moves relative to the gripper 3 in a direction orthogonal to the first reference axis X such that the second reference axis Y is decentered with respect to the first reference axis X.

In addition, when the rotation shaft 71 rotates about the first reference axis X with the second reference axis Y, that is, the axis C, restrained at a position decentered with respect to the first reference axis X, the insert 45a moves relative to the second disc 71d and the decentered body 42 moves relative to the insert 45a. Accordingly, the decentered body 42 rotates about the axis C while keeping the decentered state between the axis C and the first reference axis X. In this manner, the decentering supporter 41 not only decenters the gripper 3 with respect to the first reference axis X but also transfers rotation of the rotation shaft 71 about the first reference axis X to the decentered body 42 as rotation about the axis C decentered with respect to the first reference axis X. Since the gripper 3 is coupled to the decentered body 42, the gripper 3 also rotates about the second reference axis Y decentered with respect to the first reference axis X.

In this manner, the decentered body 42, that is, the gripper 3, is coupled to the rotation shaft 71 by the first disc 71c and the rolling elements 43 and by the second coupling 45 such that the gripper 3 is movable in parallel in the direction orthogonal to the first reference axis X. The first disc 71c and the rolling elements 43 also have the function of transferring loads of components such as the gripper 3 and the workpiece in the direction of the first reference axis X to the rotation shaft 71 such that the loads are not exerted only on the second coupling 45. As described above, the second coupling 45 also has the function of transferring rotation between the first reference axis X and the axis C decentered from each other.

Next, an action of the tilt supporter 47 will be described. When a force of tilting the hand body 2 and the gripper 3 relative to each other is exerted on at least one of the hand body 2 or the gripper 3, the base 31 is allowed to rotate about the first rotation axis D1 and the second rotation axis D2 with respect to the decentered body 42. As a result, the second reference axis Y of the base 31 is allowed to tilt with respect to the axis C of the decentered body 42. The axis C of the decentered body 42 is parallel to the first reference axis X. Thus, the second reference axis Y of the base 31 is tilted with respect to the first reference axis X.

Figure 9:
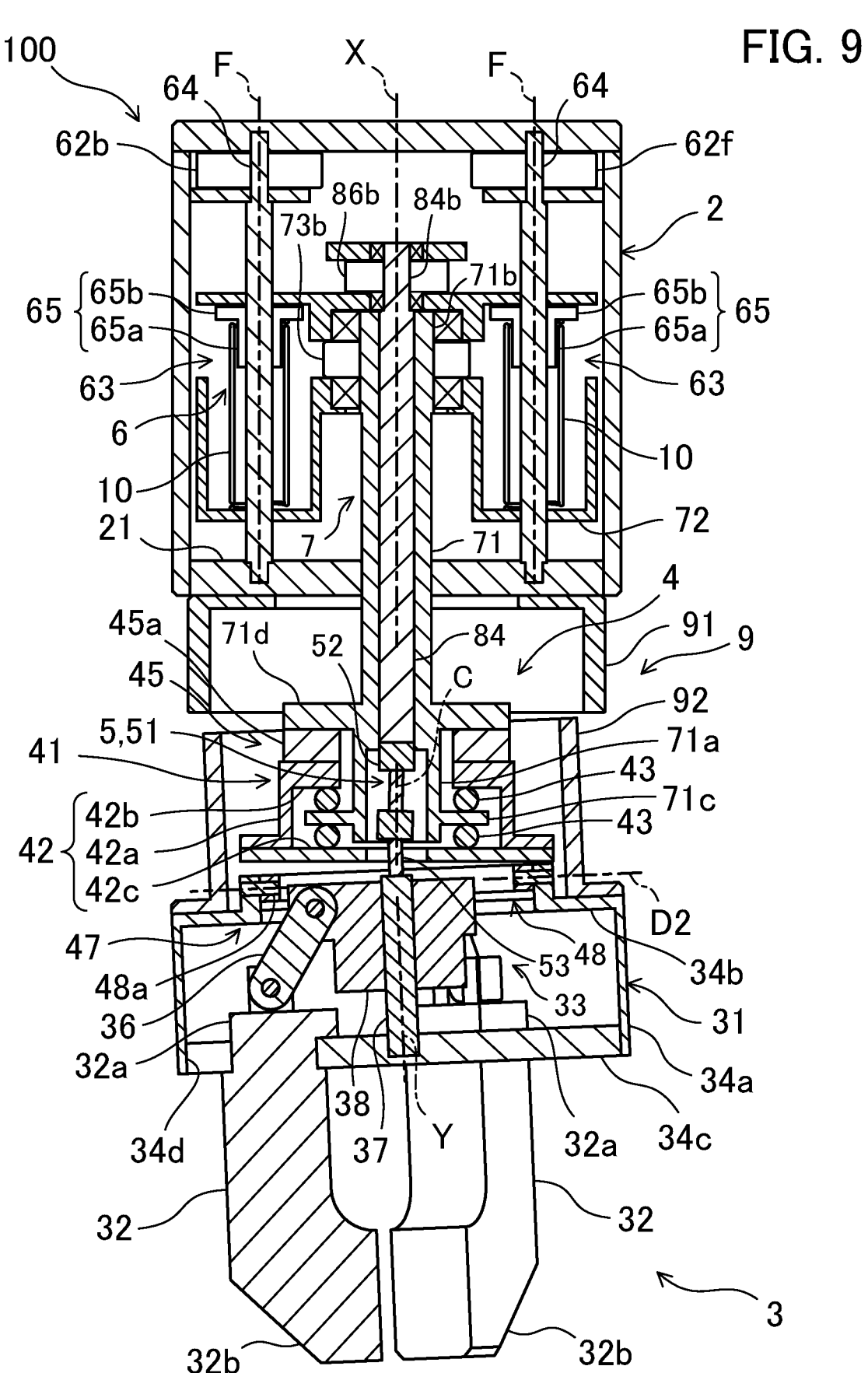
FIG. 9 is a cross-sectional view of the hand illustrating a state where the gripper has rotated about a first rotation axis with respect to the hand body.

FIG. 9 is a cross-sectional view of the hand 100 illustrating a state where the gripper 3 has rotated about the first rotation axis D1 with respect to the hand body 2. The base 31 and the coupling element 48a rotate about the first rotation axis D1 with respect to the decentered body 42. Consequently, the second reference axis Y of the gripper 3 tilts with respect to first reference axis X of the hand body 2.

Similarly, the base 31 can rotate about the second rotation axis D2 with respect to the coupling element 48a. Consequently, second reference axis Y of the gripper 3 tilts in a direction different from that in FIG. 9 with respect to the first reference axis X of the hand body 2. Such rotation of the gripper 3 about the first rotation axis D1 and rotation about the second rotation axis D2 occur in combination so that the gripper 3 thereby tilts in any direction with respect to the first reference axis X.

In the case where the gripper 3 is fixed and the hand body 2 moves relative to the gripper 3, the hand body 2 moves relative to the gripper 3 such that the second reference axis Y is tilted with respect to the first reference axis X.

When the decentered body 42 rotates about the axis C with the second reference axis Y restrained in the tilt state with respect to the first reference axis X, the coupling element 48a rotates about the first rotation axis D1 relative to the decentered body 42 and the base 31 rotates about the second rotation axis D2 relative to the coupling element 48a so that the base 31 rotates about the second reference axis Y without a change in posture of the second reference axis Y.

In this manner, the coupler 4 supports the gripper 3 such that the gripper 3 is capable of being decentered with respect to the first reference axis X and supports the gripper 3 such that the gripper 3 is capable of being tilted with respect to the first reference axis X. In addition, the coupler 4 transfers rotation of the rotation shaft 71 about the first reference axis X to the gripper 3 as rotation about the second reference axis Y with the second reference axis Y of the gripper 3 decentered or tilted with respect to the first reference axis X.

—Straight Mover and Rotator—

Figure 10:
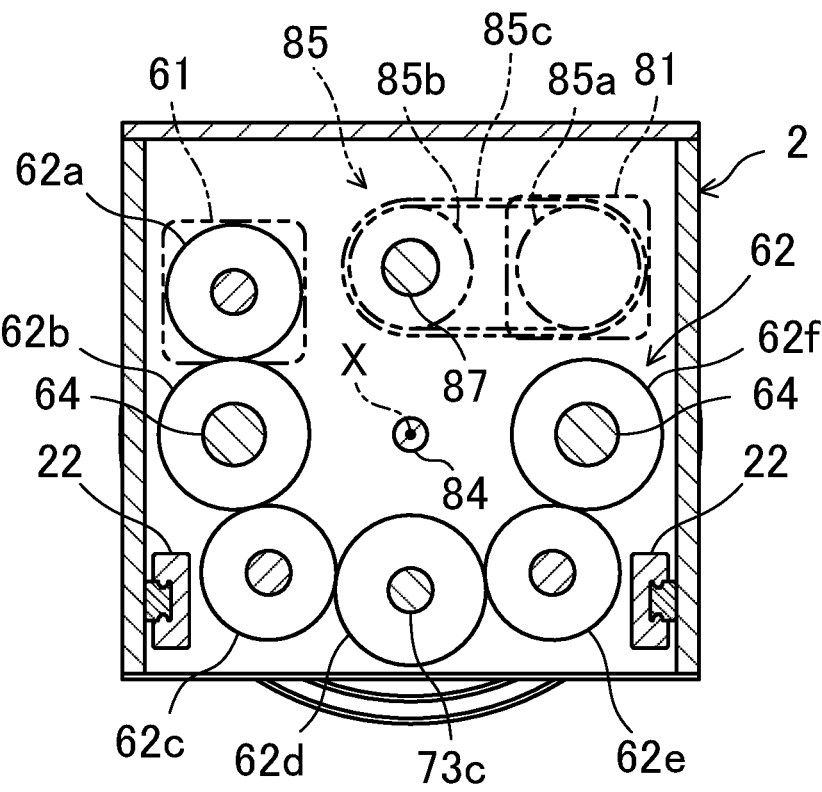
FIG. 10 is an end view of the hand taken along line X-X in FIG. 4.

The straight mover 6 moves the rotation shaft 71 in the direction of the first reference axis X to thereby move the gripper 3 straight in the direction of the first reference axis X. The rotator 7 rotates the rotation shaft 71 about the first reference axis X to thereby rotate the gripper 3 about the first reference axis X. In this example, some elements are shared by the straight mover 6 and the rotator 7. The straight mover 6 shares some elements with the opening/closing driver 8. The rotator 7 shares some elements with the opening/closing driver 8. FIG. 10 is an end view of the hand 100 taken along line X-X in FIG. 4.

The straight mover 6 includes a second motor 61, a first gear train 62 that transfers a driving force (i.e., rotation torque) of the second motor 61, screw feeders 63, a rotation shaft 71, and a gear box 72. As illustrated in FIG. 4, most part of the straight mover 6 is located in the hand body 2.

As illustrated in FIG. 4, the rotation shaft 71 is has a substantially tubular shape extending along the first reference axis X serving as a center axis of the rotation shaft 71. The rotation shaft 71 is supported by a bearing 12 attached to the hand body 2 to be movable in the direction of the first reference axis X and rotatable about the first reference axis X. One end of the rotation shaft 71 in the direction of the first reference axis X will be referred to as the first end 71*a*, and the other end of the rotation shaft 71 in the direction of the first reference axis X will be referred to as a second end 71*b*. The first end 71*a* is an end on the advancing side in the direction of the first reference axis X. The second end 71*b* is an end on the retracting side in the direction of the first reference axis X. The rotation shaft 71 penetrates the bottom 21 of the hand body 2. The first end 71*a* is located outside the hand body 2.

A flange-shaped first disc 71*c* and a second disc 71*d* each expanding in a plane orthogonal to the first reference axis X are located at the first end 71*a* of the rotation shaft 71. The first disc 71*c* is located closer to the distal end of the first end 71*a* than the second disc 71*d* is.

As illustrated in FIG. 10, the second motor 61 is located in the hand body 2. The second motor 61 is, for example, a servo motor and includes an encoder. A driver of the second motor 61 includes a current sensor. The second motor 61 is supported by the hand body 2.

As illustrated in FIG. 10, the first gear train 62 is located in the hand body 2. The first gear train 62 includes gears rotatably supported by the hand body 2. The first gear train 62 includes a first gear 62*a*, a second gear 62*b*, a third gear 62*c*, a fourth gear 62*d*, a fifth gear 62*e*, and a sixth gear 62*f*. The first gear 62*a*, the second gear 62*b*, the third gear 62*c*, the fourth gear 62*d*, the fifth gear 62*e*, and the sixth gear 62*f* are arranged in this order and mesh with one another. The first gear 62*a* is attached to an output shaft of the second motor 61. The first gear 62*a* is a driving gear. The second gear 62*b*, the third gear 62*c*, the fourth gear 62*d*, the fifth gear 62*e*, and the sixth gear 62*f* are driven gears that transfer a driving force of the second motor 61. The second gear 62*b* and the sixth gear 62*f* transfer a driving force of the second motor 61 to the straight mover 6. The fourth gear 62*d* transfers a driving force of the second motor 61 to the rotator 7. The third gear 62*c* and the fifth gear 62*e* are so-called intermediate gears (i.e., idle gears).

As illustrated in FIG. 4, the straight mover 6 includes two pairs of screw feeders 63. Each of the screw feeders 63 includes the feed screw 64 and a nut 65 as a straight-moving element that meshes with the feed screw 64.

An axis F of each feed screw 64 extends in parallel with the first reference axis X. One of the feed screws 64 is non-rotatably coupled to the second gear 62*b* of the first gear train 62. The other feed screw 64 is non-rotatably coupled to the sixth gear 62*f* of the first gear train 62. That is, the two feed screws 64 rotate about the axis F integrally with the second gear 62*b* and the sixth gear 62*f*, respectively.

Each nut 65 meshes with the feed screw 64. The nut 65 is housed in the gear box 72. The rotation of the nut 65 is stopped by the gear box 72 such that the nut 65 does not rotate about the axis F. Each nut 65 includes a cylindrical body 65*a* and a flange 65*b* fixed to the flange body 65*a*.

The nut 65 is elastically pressed against the gear box 72 by the buffer 10 in the direction of the axis F, that is, in the direction of the first reference axis X. Specifically, the buffers 10 are springs. More specifically, the buffers 10 are coil springs. In FIG. 4 the buffers 10 are simplified. Each buffer 10 is located on the advancing side of the flange 65*b* in the direction of the first reference axis X. The buffer 10 is compressed between the flange 65*b* and the gear box 72. The buffer 10 presses the gear box 72 against the nut 65 by an elastic force to the advancing side in the direction of the first reference axis X. Accordingly, when the nut 65 moves in the direction of the axis F, the gear box 72 moves in the direction of the axis F, that is, in the direction of the first reference axis X, integrally with the nut 65.

The gear box 72 is supported by linear guides 22 illustrated in FIG. 10 to be movable in the direction of the first reference axis X. FIG. 10 does not show the gear box 72. The hand body 2 includes two linear guides 22 extending in the direction of the first reference axis X. Since the gear box 72 is supported by the linear guides 22, the gear box 72 cannot rotate about the first reference axis X. In addition, the rotation shaft 71 is coupled to the gear box 72 to be rotatable about the first reference axis X and immovable in the direction of the first reference axis X. When the gear box 72 moves in the direction of the first reference axis X, the rotation shaft 71 also moves in the direction of the first reference axis X together with the gear box 72.

The rotator 7 includes a second motor 61 that generates a driving force, and the rotation shaft 71 extending along the first reference axis X serving as a center axis of the rotation shaft 71 and rotatable about the first reference axis X by a driving force of the second motor 61. The rotator 7 further includes the first gear train 62 that transfers a driving force of the second motor 61, the gear box 72, and a second gear train 73 that further transfers the driving force of the second motor 61 from the first gear train 62 to the rotation shaft 71. That is, the second motor 61, the first gear train 62, the rotation shaft 71, and the gear box 72 of the rotator 7 are shared with the straight mover 6. The second motor 61 is an example of a rotational driving source.

As illustrated in FIG. 5, the second gear train 73 includes a first gear 73*a* and a second gear 73*b*. The first gear 73*a* and the second gear 73*b* mesh with each other.

The first gear 73*a* is coupled to the fourth gear 62*d* of the first gear train 62 through a ball spline 73*c*. An axis G of the ball spline 73*c* is parallel to the first reference axis X. The ball spline 73c is non-rotatably coupled to the fourth gear 62d. That is, the ball spline 73c rotates about the axis G integrally with the fourth gear 62d.

The first gear 73a is coupled to the ball spline 73c to be non-rotatable about the axis G and movable in the direction of the axis G. In addition, the first gear 73a is supported by the gear box 72 to be immovable in the direction of the axis G and rotatable about the axis G. That is, when the ball spline 73c rotates about the axis G, the first gear 73a rotates about the axis G relative to the gear box 72 integrally with the ball spline 73c. In a case where the gear box 72 moves in the direction of the first reference axis X, that is, in the direction of the axis G, the first gear 73a also moves in the direction of the axis G integrally with the gear box 72. Even when the position of the first gear 73a in the direction of the axis G changes, the first gear 73a rotates about the axis G integrally with the ball spline 73c.

The second gear 73b is coupled to the rotation shaft 71 to be non-rotatable about the first reference axis X and immovable in the direction of the first reference axis X. The second gear 73b rotates about the first reference axis X integrally with the rotation shaft 71, and moves in the direction of the first reference axis X integrally with the rotation shaft 71. The second gear 73b is coupled to a portion of the rotation shaft 71 located inside the gear box 72. In a case where the gear box 72 moves in the direction of the first reference axis X, the rotation shaft 71 and the second gear 73b also move in the direction of the first reference axis X together with the gear box 72. At this time, meshing between the first gear 73a and the second gear 73b is maintained.

Figure 11:
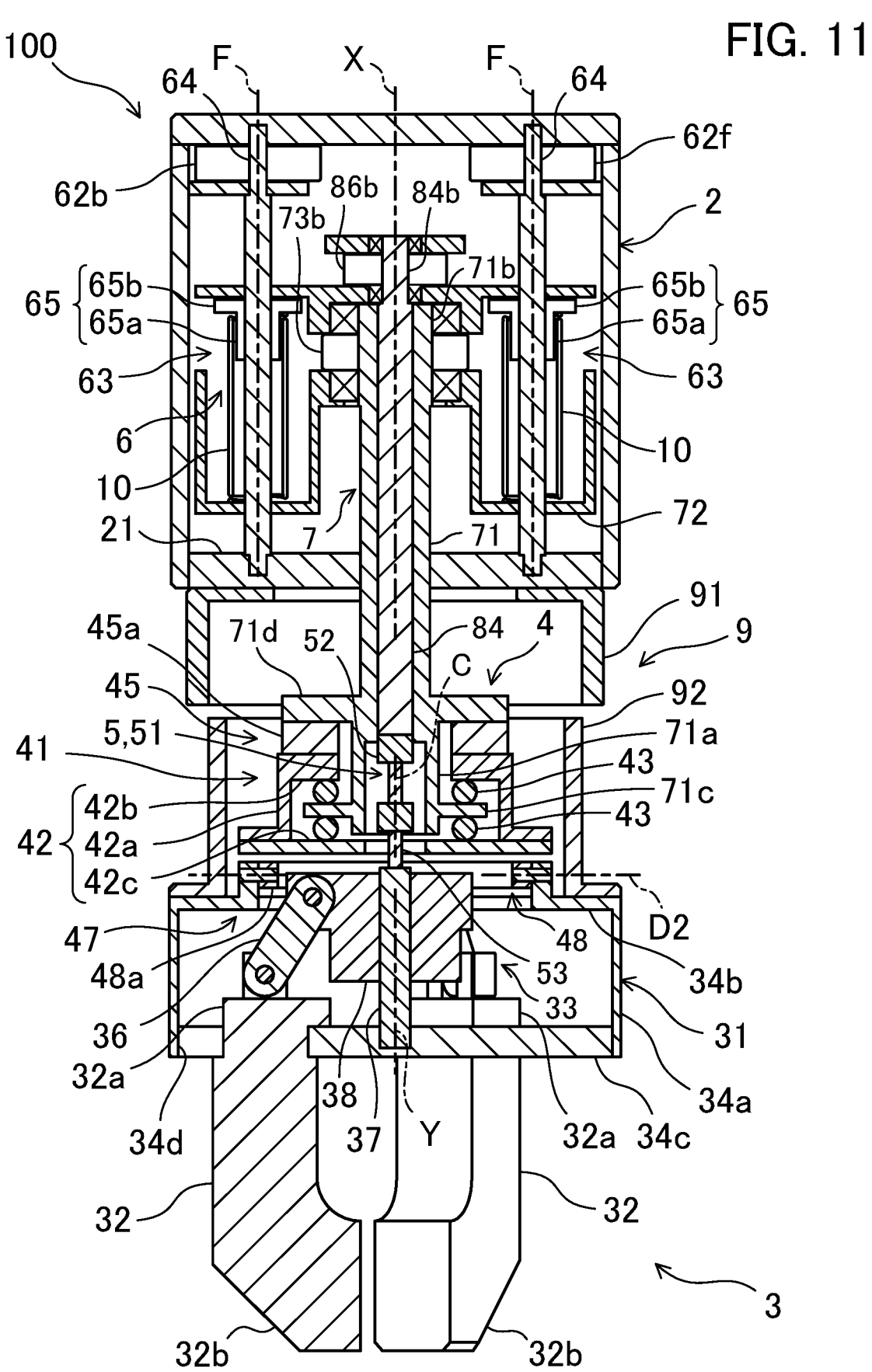
FIG. 11 is a cross-sectional view of the hand illustrating a state where a straight mover has moved the gripper in the direction of a first reference axis.

An action of the straight mover 6 and the rotator 7 thus configured will be described. FIG. 11 is a cross-sectional view of the hand 100 illustrating a state where the straight mover 6 has moved the gripper 3 in the direction of the first reference axis X.

When the second motor 61 is driven, a rotation driving force of the second motor 61 is transferred to the two feed screws 64 of the straight mover 6 and the ball spline 73c of the rotator 7 through the first gear train 62. That is, when the feed screw 64 rotates, the ball spline 73c also rotates.

When each feed screw 64 rotates about the axis F, the nut 65 screwed to the feed screw 64 moves in the direction of the axis F, as illustrated in FIG. 11. When the nut 65 moves in the direction of the axis F, the gear box 72 also moves in the direction of the axis F, that is, in the direction of the first reference axis X. When the gear box 72 moves in the direction of the first reference axis X, the rotation shaft 71 also moves in the direction of the first reference axis X integrally with the gear box 72. At this time, the first gear 73a and the second gear 73b move in the direction of the first reference axis X together with the rotation shaft 71 and the gear box 72, while meshing with each other.

When the ball spline 73c rotates about the axis G, the first gear 73a rotates about the axis G integrally with the ball spline 73c. The rotation of the first gear 73a causes the second gear 73b to rotate about the first reference axis X, and the rotation shaft 71 rotates integrally with the second gear 73b.

In this manner, the rotation shaft 71 moves in the direction of the first reference axis X while rotating about the first reference axis X. The gripper 3 is coupled to the rotation shaft 71 through the coupler 4. Accordingly, the gripper 3 moves in the direction of the first reference axis X together with the rotation shaft 71. In addition, the gripper 3 moves while rotating about the second reference axis Y.

—Opening/Closing Driver—

The opening/closing driver 8 includes a first motor 81 that generates a driving force, and an opening/closing shaft 84 that extends along the first reference axis X serving as a center axis of the opening/closing shaft 84 and is caused to rotate about the first reference axis X by a driving force of the first motor 81. The opening/closing driver 8 causes the operator 33 to act to thereby open or close the fingers 32. The opening/closing driver 8 includes a first belt transfer 85, a second belt transfer 86, and the gear box 72. That is, the gear box 72 of the opening/closing driver 8 is shared with the straight mover 6 and the rotator 7. The first motor 81 is an example of an opening/closing driving source.

As illustrated in FIG. 5, the opening/closing shaft 84 has a substantially columnar shape extending along the first reference axis X serving as a center axis of the opening/closing shaft 84. One end of the opening/closing shaft 84 in the direction of the first reference axis X will be referred to as a first end 84a, and the other end in the direction of the first reference axis X will be referred to as a second end 84b. The first end 84a is an end on the advancing side in the direction of the first reference axis X. The second end 84b is an end on the retracting side in the direction of the first reference axis X. The opening/closing shaft 84 is inserted into the rotation shaft 71 to be rotatable about the first reference axis X. The second end 84b projects outward from the second end 71b of the rotation shaft 71.

In addition, the opening/closing shaft 84 is supported by the gear box 72 to be rotatable about the first reference axis X and immovable in the direction of the first reference axis X. Accordingly, when the gear box 72 moves in the direction of the first reference axis X, the opening/closing shaft 84 also moves in the direction of the first reference axis X integrally with the gear box 72. At this time, since the rotation shaft 71 also moves in the direction of the first reference axis X integrally with the gear box 72, relative positions of the rotation shaft 71 and the opening/closing shaft 84 in the direction of the first reference axis X do not change.

The opening/closing shaft 84 is inserted in the rotation shaft 71. Since the rotation shaft 71 is supported by the hand body 2 through the bearing 12, the opening/closing shaft 84 is substantially supported by the hand body 2.

As illustrated in FIG. 10, the first motor 81 is located in the hand body 2. The first motor 81 is located at a position different from the first gear train 62 in the direction of the first reference axis X, and thus, is indicated by chain double-dashed lines in FIG. 10. The first motor 81 is, for example, a servo motor and includes an encoder. A driver of the first motor 81 includes a current sensor. The first motor 81 is supported by the hand body 2.

As illustrated in FIG. 10, the first belt transfer 85 includes a first pulley 85a, a second pulley 85b, and a timing belt 85c. The first pulley 85a is attached to an output shaft of the first motor 81. As illustrated in FIG. 5, the second pulley 85b is coupled to the ball spline 87. The ball spline 87 includes an axis E parallel to the first reference axis X. The ball spline 87 is supported by the hand body 2 to be rotatable about the axis E. The second pulley 85b is coupled to the ball spline 87 to be non-rotatable about the axis E and immovable in the direction of the axis E. The timing belt 85c is wound around the first pulley 85a and the second pulley 85b. A driving force of the first motor 81 is transferred to the second pulley 85b through the first pulley 85a and the timing belt 85c. The ball spline 87 rotates integrally with the second pulley 85b about the axis E.

As illustrated in FIG. 5, the second belt transfer 86 includes a third pulley 86a, a fourth pulley 86b, and a timing belt 86*c*. The third pulley 86*a* is coupled to the ball spline 87 to be non-rotatable about the axis E and movable in the direction of the axis E. The third pulley 86*a* is supported by the gear box 72 to be rotatable about the axis E and immovable in the direction of the axis E. The fourth pulley 86*b* is coupled to the opening/closing shaft 84 to be non-rotatable about the first reference axis X and immovable in the direction of the first reference axis X. Specifically, the fourth pulley 86*b* is coupled to the second end 84*b* of the opening/closing shaft 84 projecting from the rotation shaft 71. The fourth pulley 86*b* is supported by the gear box 72 to be rotatable about the first reference axis X and immovable in the direction of the first reference axis X. The timing belt 86*c* is wound around the third pulley 86*a* and the fourth pulley 86*b*. Rotation of the ball spline 87 about the axis E is transferred to the fourth pulley 86*b* through the third pulley 86*a* and the timing belt 86*c*.

In this manner, a driving force of the first motor 81 is transferred to the opening/closing shaft 84 through the first belt transfer 85 and the second belt transfer 86. Accordingly, the opening/closing shaft 84 rotates about the first reference axis X. Since the opening/closing shaft 84 is inserted in the rotation shaft 71 to be rotatable about the first reference axis X, the opening/closing shaft 84 rotates about the first reference axis X independently of the rotation shaft 71. The opening/closing shaft 84 and the second belt transfer 86 are supported by the gear box 72 to be immovable in the direction of the first reference axis X. Thus, while the gear box 72 moves in the direction of the first reference axis X, the opening/closing shaft 84 and the second belt transfer 86 move in the direction of the first reference axis X together with the gear box 72. At this time, the third pulley 86*a* moves along the ball spline 87 in the direction of the axis E. Even when the opening/closing shaft 84 and the second belt transfer 86 move in the direction of the first reference axis X together with the gear box 72, a driving force of the first motor 81 is transferred to the opening/closing shaft 84 through the first belt transfer 85 and the second belt transfer 86.

As FIG. 5, the coupler 4 includes a transfer 5 that transfers a driving force of the opening/closing driver 8 to the gripper 3. The transfer 5 transfers a driving force of the opening/closing driver 8 to the gripper 3 with the second reference axis Y decentered or tilted with respect to the first reference axis X. The transfer 5 includes a first coupling 51 that couples the opening/closing shaft 84 and the operator 33 to each other.

The first coupling 51 transfers rotation of the opening/closing shaft 84 to the operator 33 with the second reference axis Y decentered or tilted with respect to the first reference axis X. The first coupling 51 is a coupling that transfers rotation even when two axes have displacement such as angular misalignment or decentering. Specifically, the first coupling 51 includes a first ball coupling 52 and a second ball coupling 53. The first ball coupling 52 and the second ball coupling 53 are simplified in the drawings. Each of the first ball coupling 52 and the second ball coupling 53 is a coupling having both functions as a universal joint (i.e., universal coupling) and a spline, and transfers rotation even when a shift such as angular misalignment or decentering occurs between two axes.

The first ball coupling 52 couples the first end 84*a* of the opening/closing shaft 84 and the second ball coupling 53. The first ball coupling 52 transfers rotation of the opening/closing shaft 84 about the first reference axis X to the second ball coupling 53. The second ball coupling 53 couples the first ball coupling 52 and the feed screw 37 of the operator

33. The second ball coupling 53 transfers rotation of the first ball coupling 52 to the feed screw 37 as rotation about the second reference axis Y.

Even when the second reference axis Y is decentered or tilted with respect to the first reference axis X, the first ball coupling 52 and the second ball coupling 53 absorb decentering and angular misalignment between the first reference axis X and the second reference axis Y and transfers rotation about the first reference axis X as rotation about the second reference axis Y.

Figure 12:
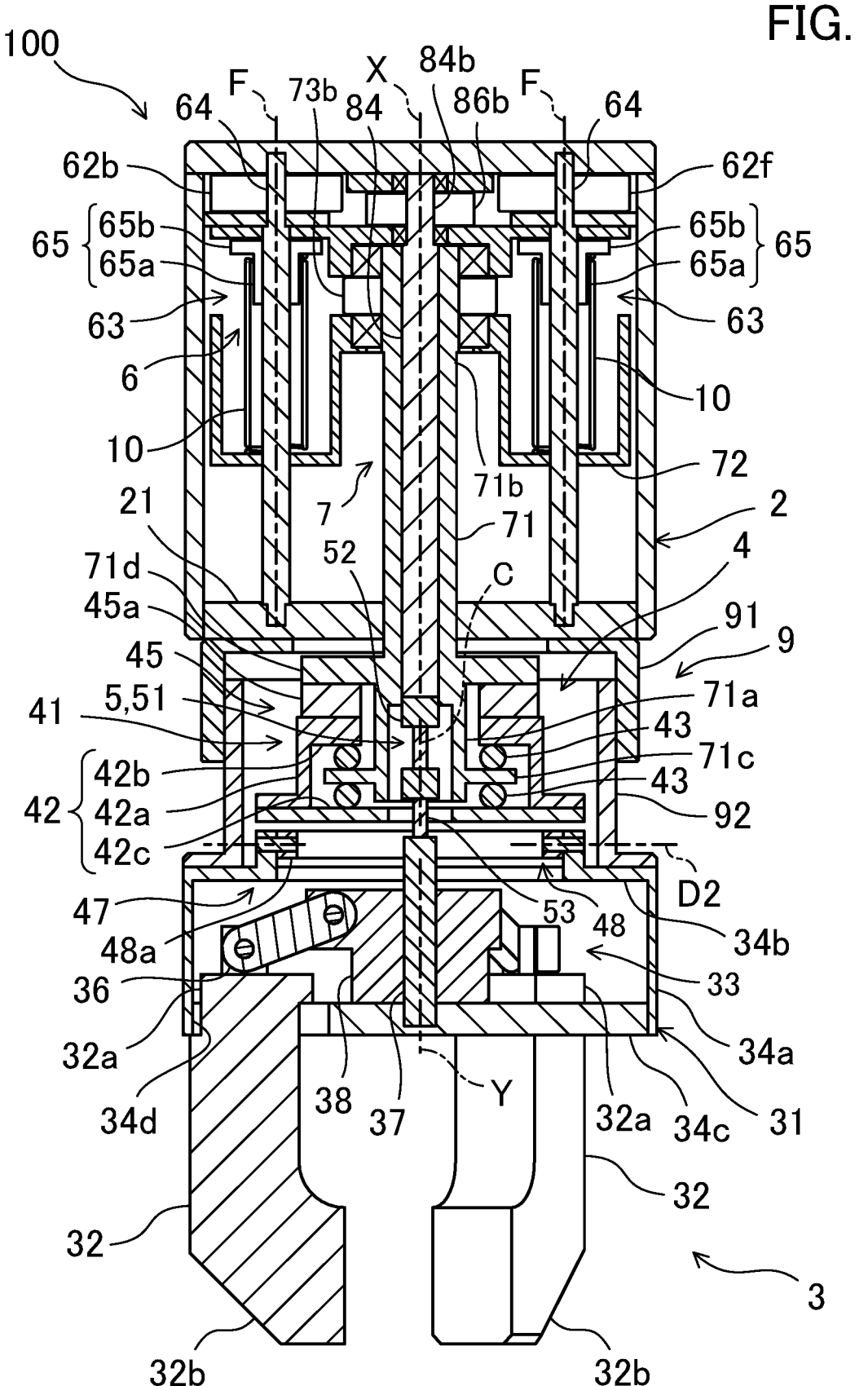
FIG. 12 is a cross-sectional view of the hand illustrating a state where an opening/closing driver causes fingers to perform an opening action.

Actions of the opening/closing driver 8 and the transfer 5 thus configured will be described. FIG. 12 is a cross-sectional view of the hand 100 illustrating a state where opening/closing driver 8 causes the fingers 32 to perform an opening action.

When the first motor 81 operates, a rotation driving force of the first motor 81 is transferred to the ball spline 87 through the first pulley 85*a*, the timing belt 85*c*, and the second pulley 85*b*, as illustrated in FIG. 5. When the ball spline 87 rotates about the axis E, the third pulley 86*a* coupled to the ball spline 87 rotates about the axis E. Rotation of the third pulley 86*a* is transferred to the opening/closing shaft 84 through the timing belt 86*c* and the fourth pulley 86*b*. In this manner, the opening/closing shaft 84 rotates about the first reference axis X. Rotation of the opening/closing shaft 84 about the first reference axis X is transferred to the feed screw 37 of operator 33 as rotation about the second reference axis Y through the transfer 5. When the feed screw 37 rotates about the second reference axis Y, the block 38 moves in the direction of the second reference axis Y. At this time, as illustrated in FIG. 12, when the block 38 approaches the bottom 34*c*, the fingers 32 move radially outward about the second reference axis Y. On the other hand, as illustrated in FIG. 4, when the block 38 moves away from the bottom 34*c*, the fingers 32 move radially inward. In this manner, the opening/closing driver 8 opens and closes the fingers 32. Accordingly, the fingers 32 grip a workpiece and release gripping of the workpiece. At this time, the fingers 32 open or close such that the distances from the second reference axis Y are the same. That is, the fingers 32 open and close about the second reference axis Y.

The direction of movement of the block 38 in the direction of the second reference axis Y, that is, whether the fingers 32 open or close, is switched depending on the rotation direction of the first motor 81. The position of the fingers 32 in the radial direction about the second reference axis Y, that is, the degree of opening/closing of the fingers 32, is detected based on an encoder output of the first motor 81. In addition, a rotation torque of the first motor 81 in opening or closing of the three fingers 32 is detected based on a detection result of the current sensor.

When the straight mover 6 moves the rotation shaft 71 and the gripper 3 in the direction of the first reference axis X, the opening/closing shaft 84 and the second belt transfer 86 supported by the gear box 72 also move in the direction of the first reference axis X together with the rotation shaft 71. A driving force of the first motor 81 is kept in a state where the driving force can be transferred to the opening/closing shaft 84 through the first belt transfer 85 and the second belt transfer 86. That is, even when the rotation shaft 71 and the gripper 3 move in the direction of the first reference axis X, the fingers 32 of the gripper 3 can be opened or closed by the driving force of the first motor 81.

It should be noted that while the rotation shaft 71 and the gripper 3 are moved in the direction of the first reference axis X by the straight mover 6, the gripper 3 is rotated about the first reference axis X by the rotator 7. That is, the base 31 and the fingers 32 rotate about the first reference axis X. At this time, unless the opening/closing shaft 84 rotates about the first reference axis X, the feed screw 37 does not rotate about the first reference axis X, either. Thus, the base 31 rotates about the first reference axis X with respect to the feed screw 37. Consequently, the block 38 moves in the direction of the second reference axis Y and the opening/closing state of the fingers 32 changes.

In view of this, in a case where the rotation shaft 71 moves in the direction of the first reference axis X and the opening/closing state of the fingers 32 is maintained, the first motor 81 rotates the opening/closing shaft 84 about the first reference axis X in conformity with rotation of the gripper 3 about the first reference axis X. Specifically, the first motor 81 is subjected to torque control so that a torque of the first motor 81 is controlled to be kept uniform. Accordingly, the fingers 32 move in the direction of the first reference axis X, while rotating about the first reference axis X with the opening/closing state maintained (e.g., a state where the fingers 32 grip a workpiece maintained).

In addition, since the gripper 3 is supported by the coupler 4, the second reference axis Y of the gripper 3 is capable of being decentered with respect to the first reference axis X, as illustrated in FIG. 8. Alternatively, the second reference axis Y of the gripper 3 is capable of being tilted with respect to the first reference axis X, as illustrated in FIG. 9. Even in such cases, the first ball coupling 52 and the second ball coupling 53 are deformed so that the state where the opening/closing shaft 84 and the operator 33 are coupled is thereby maintained. Furthermore, rotation of the opening/closing shaft 84 about the first reference axis X is transferred to the operator 33 as rotation about the second reference axis Y through the first ball coupling 52 and the second ball coupling 53. In this example, since the first coupling 51 includes two couplings, that is, the first ball coupling 52 and the second ball coupling 53, the first coupling 51 can be flexibly used for decentering and tilting between the first reference axis X and the second reference axis Y.

—Buffer—

The buffers 10 elastically support the gripper 3 in the direction of the first reference axis X. The buffers 10 absorb a force exerted on the gripper 3 in the direction of the first reference axis X by elastic support by the gripper 3.

As described above, the buffers 10 are springs. As illustrated in FIG. 4, each of the buffers 10 elastically couples the nut 65 of the screw feeder 63 and the gear box 72 to each other. Since the hand 100 includes the two screw feeders 63, the hand 100 includes two buffers 10. Specifically, each buffer 10 is housed in the gear box 72. The buffer 10 elastically couples the nut 65 and the gear box 72 to each other such that the gear box 72 is deformable to the retracting side with respect to the nut 65 in the direction of the first reference axis X. The opening/closing shaft 84 and the rotation shaft 71 are coupled to the gear box 72. The gripper 3 is coupled to the opening/closing shaft 84 and the rotation shaft 71 through the coupler 4. That is, the buffers 10 substantially support the gripper 3 such that the gripper 3 is deformable to the retracting side in the direction of the first reference axis X.

In these buffers 10, when a force is exerted on the gripper 3 (e.g., the fingers 32) to the retracting side in the direction of the first reference axis X, this force is transferred from the gripper 3 to the nuts 65 through the coupler 4, the rotation shaft 71, the gear box 72, and the buffers 10. At this time, the buffers 10 are elastic deformed, that is, compressively deformed, and the gear box 72 moves to the retracting side in the direction of the first reference axis X. The opening/closing shaft 84, the rotation shaft 71, and the gripper 3 also move to the retracting side in the direction of the first reference axis X integrally with the gear box 72. In this manner, a force exerted on the gripper 3 is absorbed by the buffers 10.

—Lock—

As illustrated in FIG. 4, the lock 9 includes a first engaging portion 91 located in the hand body 2, and a second engaging portion 92 located in the gripper 3. The lock 9 locks movement of the coupler 4, that is, movement of the decentering supporter 41 and the tilt supporter 47 by engagement between the first engaging portion 91 and the second engaging portion 92, and releases locking of the movement of the coupler 4 by disengaging the first engaging portion 91 and the second engaging portion 92.

Specifically, the first engaging portion 91 is located at the bottom 21 on the outer side of the hand body 2. The first engaging portion 91 has a substantially tubular shape extending along the first reference axis X serving as a center axis of the first engaging portion 91.

The second engaging portion 92 is located at the celling 34b on the outer side of the base 31. The second engaging portion 92 faces the first engaging portion 91. The second engaging portion 92 has a substantially tubular shape extending along the second reference axis Y serving as a center axis of the second engaging portion 92. The second engaging portion 92 is located at the celling 34b to surround the coupler 4. That is, the coupler 4 is located inside the second engaging portion 92.

The second engaging portion 92 is fitted in the first engaging portion 91 to be thereby engaged with the first engaging portion 91. That is, the outer diameter of the second engaging portion 92 is slightly smaller than the inner diameter of the first engaging portion 91. Since the second engaging portion 92 is located in the base 31, when the straight mover 6 moves the coupler 4 in the direction of the first reference axis X, relative positions of the first engaging portion 91 and the second engaging portion 92 in the direction of the first reference axis X change. The second engaging portion 92 switches between engagement and disengagement of the second engaging portion 92 and the first engaging portion 91 by straight movement of the coupler 4 by the straight mover 6. Specifically, when the gripper 3 approaches the hand body 2 in the direction of the first reference axis X, the second engaging portion 92 is fitted in and engaged with the first engaging portion 91. On the other hand, when the gripper 3 moves away from the hand body 2 in the direction of the first reference axis X, the second engaging portion 92 and the first engaging portion 91 are disengaged.

The lock 9 locks movement of the decentering supporter 41 and the tilt supporter 47 by engaging the second engaging portion 92 with the first engaging portion 91. Specifically, as illustrated in FIG. 4, the engagement between the first engaging portion 91 and the second engaging portion 92 stops movement of the gripper 3 in a direction orthogonal to the first reference axis X and movement of the gripper 3 with which the second reference axis Y tilts with respect to the first reference axis X. At this time, the first reference axis X and the second reference axis Y are aligned in a straight line. In this manner, the lock 9 locks movement of the decentering supporter 41 and the tilt supporter 47 by engagement between the first engaging portion 91 and the second engaging portion 92 with the first reference axis X and the second reference axis Y aligned in a straight line.

It should be noted that even while the first engaging portion 91 and the second engaging portion 92 are engaged, the first engaging portion 91 and the second engaging portion 92 do not lock relative movement of the hand body 2 and the gripper 3 in the direction of the first reference axis X. Accordingly, even in the locked state by the lock 9, the buffers 10 effectively function.

When the straight mover 6 moves the coupler 4 in a direction in which the gripper 3 moves away from the hand body 2 in the direction of the first reference axis X, as illustrated in FIG. 11, the second engaging portion 92 is gradually released from the first engaging portion 91 so that the first engaging portion 91 and the second engaging portion 92 are disengaged. In this state, the coupler 4 allows the gripper 3 to be decentered or tilted with respect to the first reference axis X.

Figure 13:
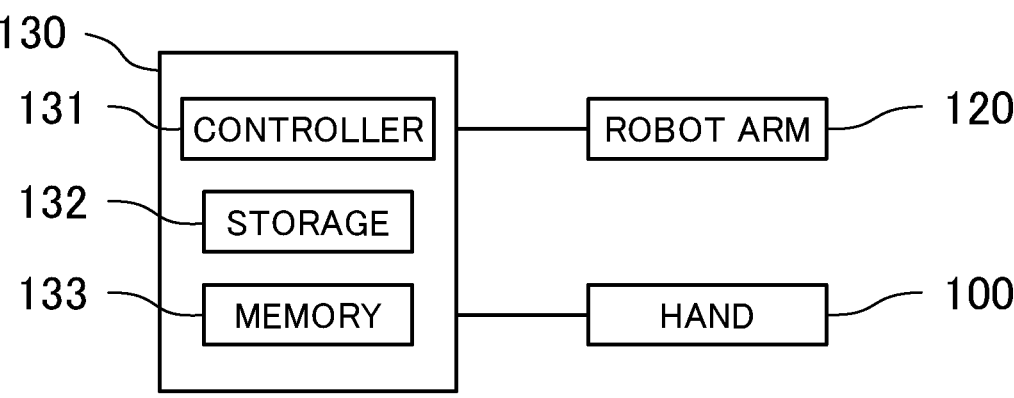
FIG. 13 is a block diagram schematically illustrating a hardware configuration of a controller.

Control of the robot arm 120 and the hand 100 by the controller 130 will now be described. FIG. 13 schematically illustrates a hardware configuration of the controller 130. The controller 130 includes a processor 131, a storage 132, and a memory 133.

The processor 131 performs various functions of the controller 130 by reading and developing programs from the storage 132 to the memory 133. The processor 131 is a processor such as a central processing unit (CPU). The processor 131 may be a unit such as a micro controller unit (MCU), a micro processor unit (MPU), a field program-mable gate array (FPGA), a programmable logic controller (PLC), or large scale integrated circuit (system LSI).

The processor 131 controls a motor of the robot arm 120 to thereby control action of the robot arm 120. The processor 131 also controls the first motor 81 and the second motor 61 to thereby control actions of the hand 100.

The storage 132 stores programs and various types of data to be executed by the processor 131. The storage 132 is a device such as a nonvolatile memory hard disc drive (HDD) or a solid state drive (SSD). The memory 133 temporarily stores data and the like. The memory 133 is, for example, a volatile memory.

Figure 14:
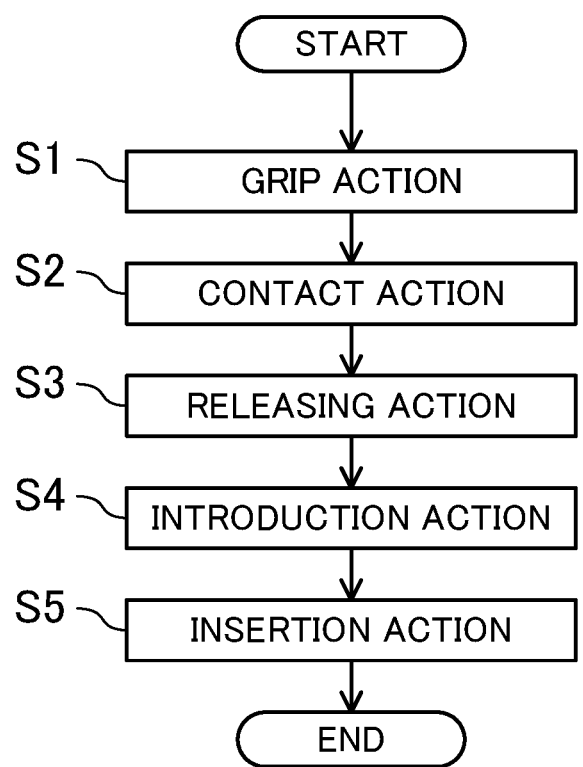
FIG. 14 is a flowchart of insertion work.

Specific control by the controller 130 will now be described. Insertion work of inserting a workpiece W1 gripped by the hand 100 into a hole H in another workpiece W2 will be described. The workpiece W1 has a columnar shape extending along an axis M serving a center axis of the workpiece W1. The hole H is a round hole in which the workpiece W1 is fitted. The hole H extends along an axis N serving as a center axis of the hole H. FIG. 14 is a flowchart of the insertion work.

First, in step S1, the controller 130 causes the robot arm 120 and the hand 100 to perform a grip action of gripping the workpiece W1 with the gripper 3. Specifically, the controller 130 causes the three fingers 32 to open more widely than the outer diameter of the workpiece W1. The controller 130 moves the robot arm 120 such that an end of the workpiece W1 is located on the inner side of the three fingers 32. Then, the controller 130 causes the three fingers 32 to close. Accordingly, the three fingers 32 grip the workpiece W1. At this time, axis M of the workpiece W1 is aligned with the second reference axis Y in a straight line. Since the first reference axis X and the second reference axis Y are aligned in a straight line, the axis M of the workpiece W1 is also aligned with the first reference axis X in a straight line.

At this time, the controller 130 sets the lock 9 in a locking state. That is, the first engaging portion 91 and the second engaging portion 92 are engaged with each other, and the gripper 3 is neither decentered nor tilted with respect to the first reference axis X of the hand body 2. Accordingly, the controller 130 accurately positions the gripper 3 in a grip action or its following action.

Alternatively, the controller 130 may perform a grip action with locking of the lock 9 released. Since the gripper 3 is allowed to be decentered or tilted with respect to the first reference axis X, the position of the gripper 3 is naturally adjusted such that the gripper 3 can appropriately grip the workpiece W1 without accurate positional adjustment between the gripper 3 and the workpiece W1.

Figure 15:
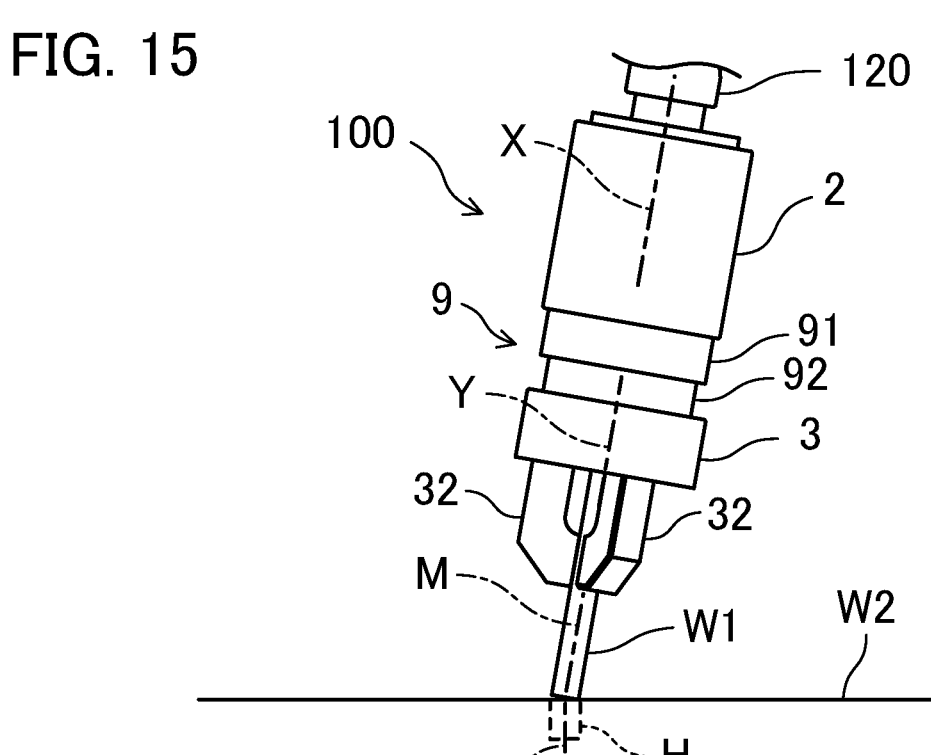
FIG. 15 is a schematic view of the hand seen from the front when contact action is completed.
Figure 16:
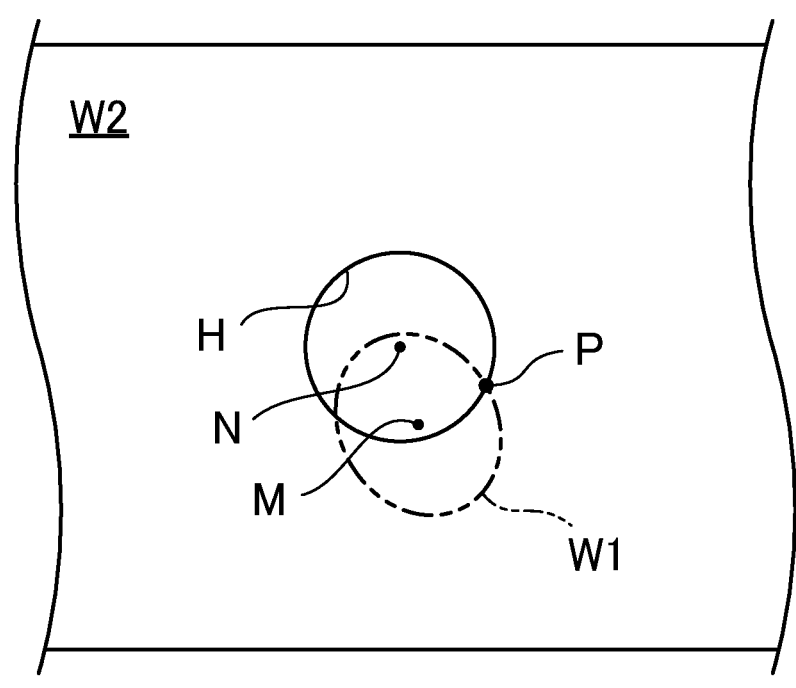
FIG. 16 is a schematic plan view illustrating a positional relationship between a workpiece and a hole when the contact action is completed.

After the gripper 3 has gripped the workpiece W1, the controller 130 causes the robot arm 120 and the hand 100 to perform a contact action of bringing the workpiece W1 into contact with an opening edge of the hole H in step S2. FIG. 15 is a schematic view of the hand 100 seen from the front when the contact action is completed. FIG. 16 is a schematic plan view illustrating a positional relationship between the workpiece W1 and the hole H when the contact action is completed.

Specifically, as illustrated in FIG. 15, the controller 130 moves the robot arm 120 such that the workpiece W1 is brought into contact with the opening edge of the hole H with the first reference axis X and the second reference axis Y tilted with respect to the axis N of the hole H. The robot arm 120 brings an edge of an end the workpiece W1 opposite to the end gripped by the fingers 32 into contact with the opening edge of the hole H. Since the axis M of the workpiece W1 is aligned with the second reference axis Y in a straight line, the axis M of the workpiece W1 also tilt with respect to the axis N of the hole H.

Since the workpiece W1 has a columnar shape, the edge of the workpiece W1 is circular. Since the hole H is a round hole, the opening edge of the hole H is circular. When the edge of the circular shape of the workpiece W1 contacts the opening edge of the circular shape of the hole H with the axis M of the workpiece W1 tilted with respect to the axis N of the hole H, the workpiece W1 is brought into point contact or line contact with the opening edge of the hole H. In this example, the robot arm 120 changes the axis M to a twisted position with respect to the axis N to thereby bring the workpiece W1 into point contact with the opening edge of the hole H at a point P, as illustrated in FIG. 16.

In the contact action, the lock 9 is in the locking state, and locks the decentering supporter 41 and the tilt supporter 47. Accordingly, the controller 130 accurately performs position adjustment of the gripper 3, that is, position adjustment of the workpiece W1. Since the buffers 10 effectively function in the locked state by the lock 9, the buffers 10 can absorb an impact on the workpiece W1 occurring when the work-piece W1 is brought into contact with the opening edge of the hole H. Accordingly, quick work by the robot arm 120 and the hand 100 can be achieved.

Figure 17:
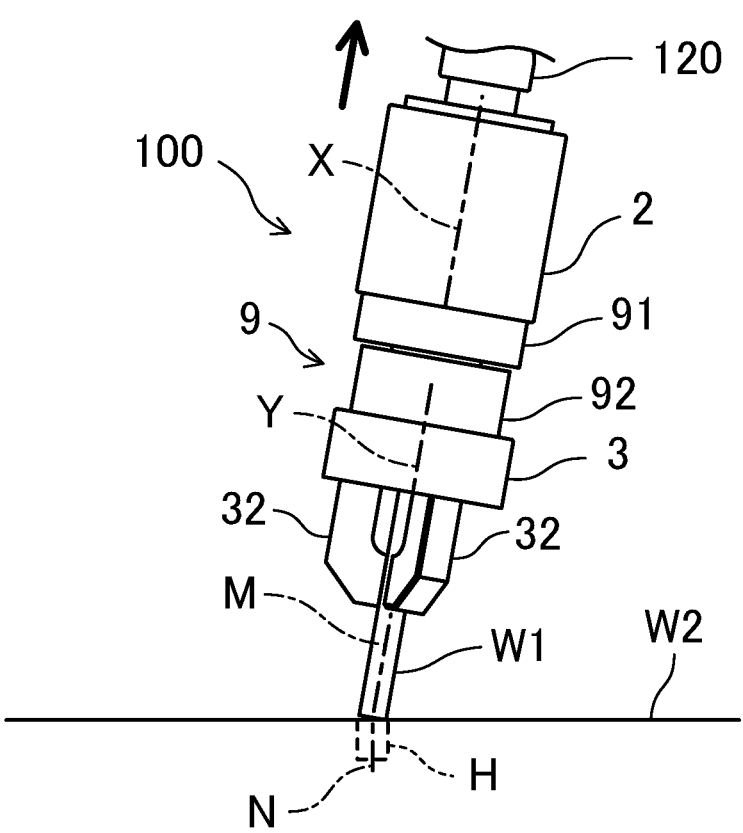
FIG. 17 is a schematic view of the hand seen from the front in a releasing action.

Subsequently, in step S3, the controller 130 causes the robot arm 120 and the hand 100 to perform a releasing action of releasing locking of the coupler 4 by the lock 9. FIG. 17 is a schematic view of the hand 100 seen from the front in the releasing action.

Specifically, the straight mover 6 advances the coupler 4 from the hand body 2 in the direction of the first reference axis X to thereby disengage the first engaging portion 91 and the second engaging portion 92, and at the same time, the robot arm 120 retracts the hand body 2 in the direction of the first reference axis X to the same distance as the distance in which the coupler 4 advances (see the bold arrow). That is, as illustrated in FIG. 17, the absolute positions of the gripper 3 and the coupler 4 do not change, and the hand body 2 is displaced relative to the gripper 3 and the coupler 4 in the direction of the first reference axis X. Consequently, locking by the lock 9 is released with the position and posture of the workpiece W1 with respect to the hole H unchanged, that is, the state where the axis M of the workpiece W1 is tilted with respect to the axis N of the hole H and the workpiece W1 is in point contact with the opening edge of the hole H maintained.

The amount of advancement of the coupler 4 in the direction of the first reference axis X for disengaging the first engaging portion 91 and the second engaging portion 92 is determined based on dimensions of the first engaging portion 91, the second engaging portion 92, and so forth. When the controller 130 advances the coupler 4 in the direction of the first reference axis X to a distance sufficient for disengagement, the controller 130 completes the releasing action.

Figure 18:
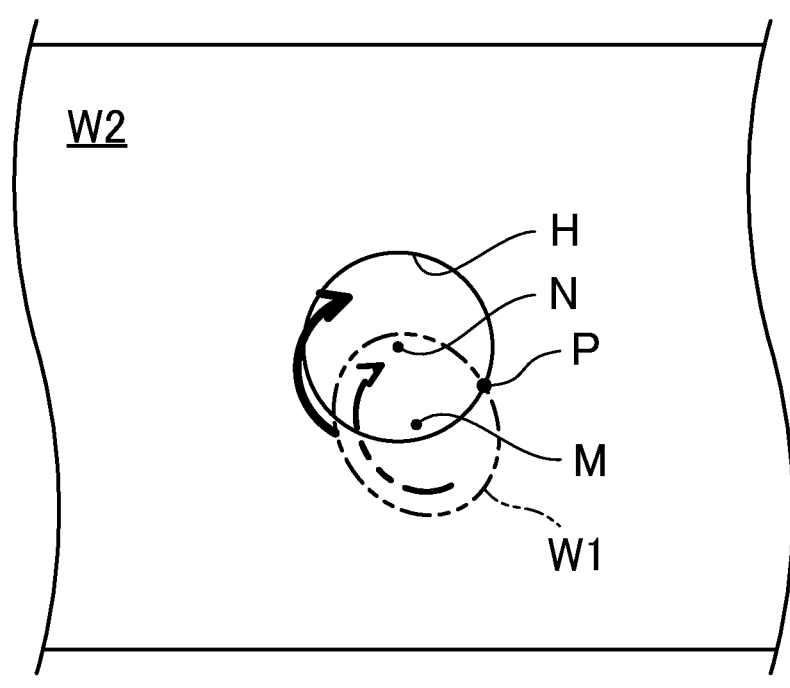
FIG. 18 is a schematic plan view illustrating a positional relationship between the workpiece and the hole at start of an introduction action.
Figure 19:
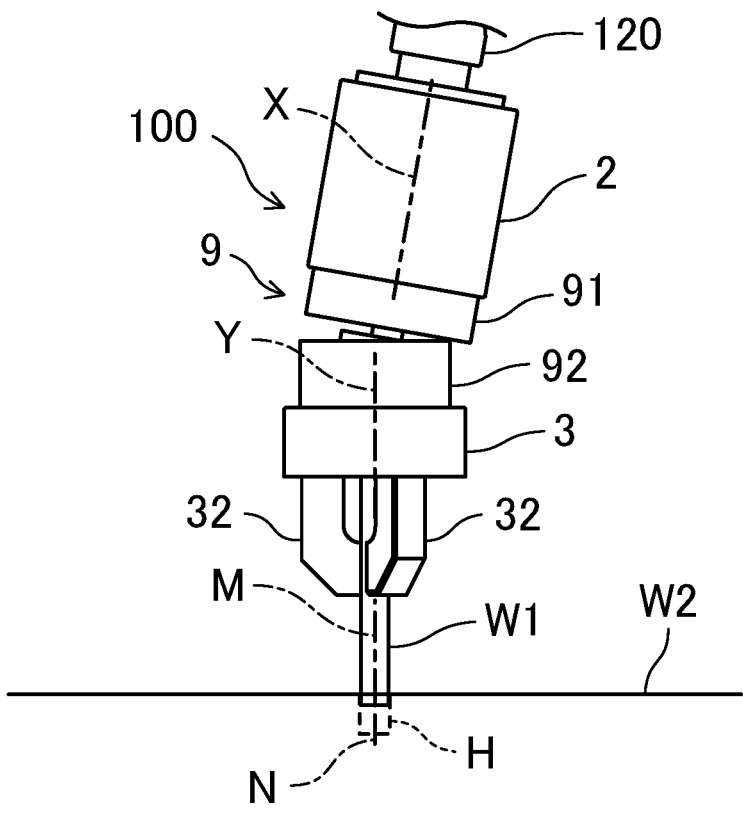
FIG. 19 is a schematic view of the hand seen from the front when introduction action is completed.

After locking by the lock 9 is released, in step S4, the controller 130 causes the hand 100 to perform an introduction action of actuating the rotator 7 with the first reference axis X tilted with respect to the axis N of the hole H to thereby partially insert the workpiece W1 into the hole H. FIG. 18 is a schematic plan view illustrating a positional relationship between the workpiece W1 and the hole H at start of the introduction action. FIG. 19 is a schematic view of the hand 100 seen from the front when the introduction action is completed.

Specifically, the controller 130 stops movement of the robot arm 120 when the releasing action is completed, whereas the controller 130 continues advancement of the coupler 4 in the direction of the first reference axis X by the straight mover 6. At this time, the rotator 7 also acts concurrently with the straight mover 6. Accordingly, in the state where the gripper 3 is allowed to be decentered and tilted with respect to the first reference axis X, the coupler 4 advances in the direction of the first reference axis X while rotating about the first reference axis X.

As illustrated in FIG. 18, from the state where the workpiece W1 is in point contact with the opening edge of the hole H, the workpiece W1 rotates about the second reference axis Y, that is, about the axis M (see the chain double-dashed arrow). As a result, the workpiece W1 pivots about the point P and is guided by the opening edge of the hole H so that an end of the workpiece W1 is fitted in the hole H (see the bold arrow). In this process, the workpiece W1 gradually changes the posture such that the axis M coincides with the axis N of the hole H. Since locking of the coupler 4 by the lock 9 is released, the gripper 3 is allowed to be decentered or tilted with respect to the first reference axis X. That is, the workpiece W1 can change the posture such that the axis M coincides with the axis N, while being gripped by the gripper 3. In addition, the tilt supporter 47 can transfer rotation of the rotation shaft 71 about the first reference axis X to the gripper 3 as rotation about the second reference axis Y with the second reference axis Y of the gripper 3 tilted with respect to the first reference axis X. Accordingly, the workpiece W1 gradually changes the posture such that the axis M coincides with the axis N, while rotating about the second reference axis Y, that is, about the axis M. In this manner, an end of the workpiece W1 is smoothly inserted into the hole H. When the amount of advancement of the coupler 4 in the direction of the first reference axis X from the start of the introduction action reaches a predetermined amount, the controller 130 completes the introduction action.

As illustrated in FIG. 19, at the completion of the introduction action, the second reference axis Y of the gripper 3 is tilted with respect to the first reference axis X. The second reference axis Y and the axis M of the workpiece W1 are aligned in a straight line with the axis N of the hole H. The position and the posture of the hand body 2 do not change from the start of the introduction action.

Figure 20:
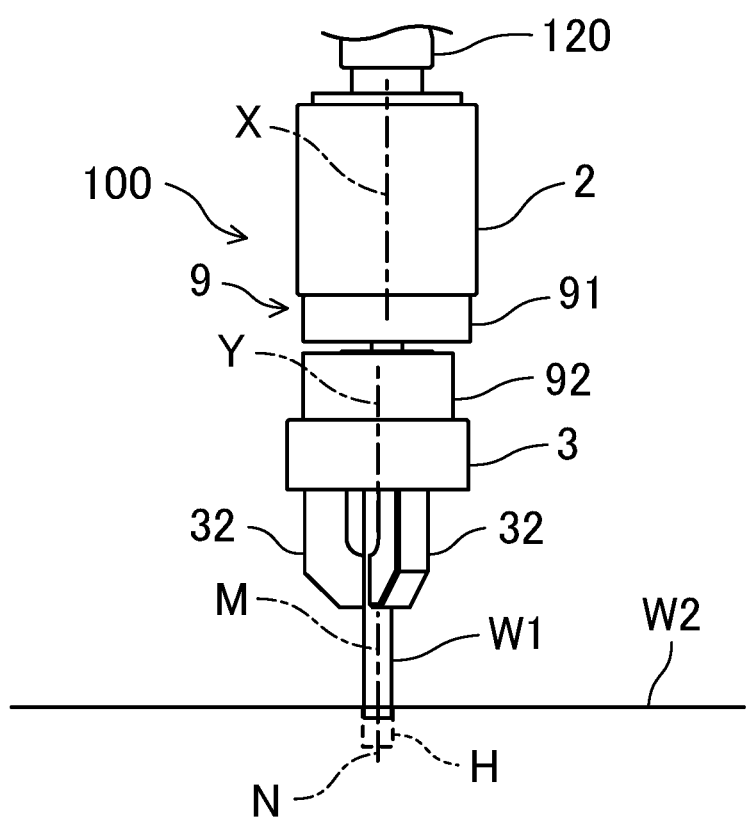
FIG. 20 is a schematic view of the hand seen from the front during the course of an insertion action.
Figure 21:
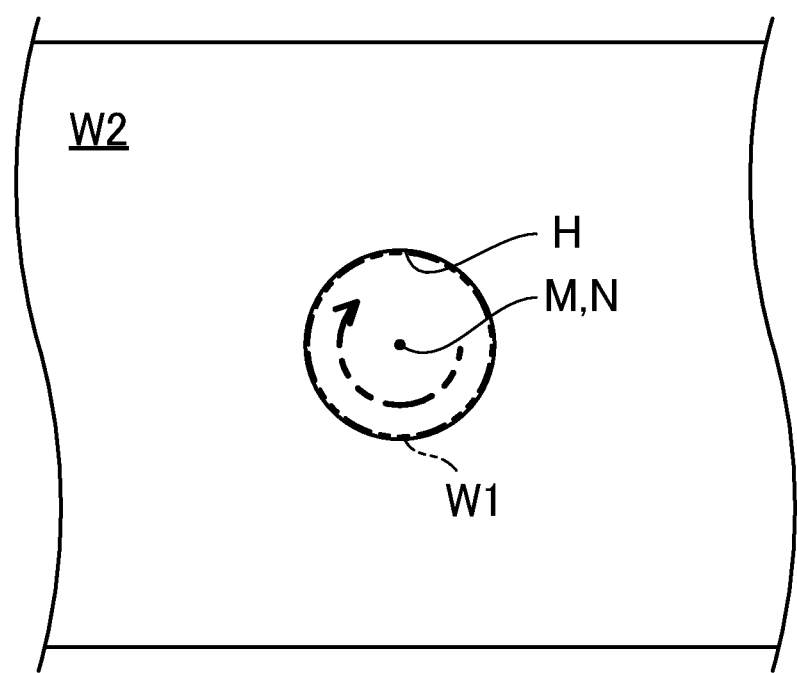
FIG. 21 is a schematic plan view illustrating a positional relationship between the workpiece and the hole in the insertion action.
Figure 22:
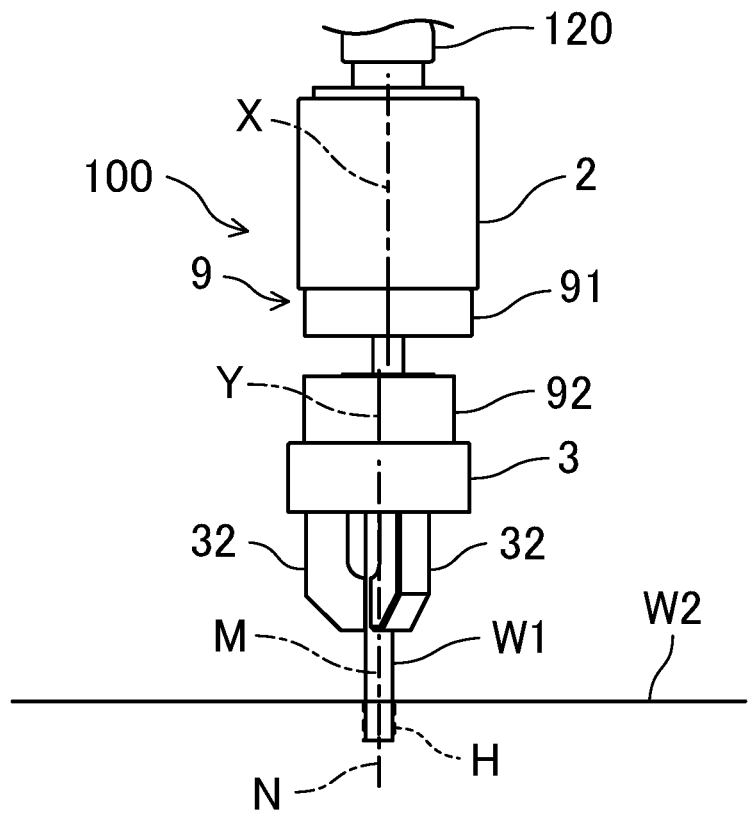
FIG. 22 is a schematic view of the hand seen from the front when the insertion action is completed.

Thereafter, in the step S5, the controller 130 causes the robot arm 120 and the hand 100 to perform an insertion action of inserting the workpiece W1 into the hole H by actuating the rotator 7 with the first reference axis X parallel to the axis N of the hole H. FIG. 20 is a schematic view of the hand 100 seen from the front in the insertion action. FIG. 21 is a schematic plan view illustrating a positional relationship between the workpiece W1 and the hole H in the insertion action. FIG. 22 is a schematic view of the hand 100 seen from the front when the insertion action is completed.

Specifically, as illustrated in FIG. 20, the controller 130 causes the robot arm 120 to change the tilt of the hand body 2 such that the first reference axis X is parallel to the axis N of the hole H. Since an end of the workpiece W1 is inserted in the hole H, the gripper 3 is restrained in a state where the second reference axis Y and the axis N of the hole H are aligned in a straight line. The disposition of the coupler 4 allows the gripper 3 to be decentered and tilted with respect to the first reference axis X. Consequently, the hand body 2 can be in a state where the first reference axis X is parallel to and decentered with respect to the second reference axis Y and the axis N. In some cases, the first reference axis X can be aligned with the second reference axis Y and the axis N in a straight line.

In this state, the controller 130 actuates the straight mover 6 and the rotator 7. The tilt supporter 47 can transfer rotation of the rotation shaft 71 about the first reference axis X to the gripper 3 as rotation about the second reference axis Y with the second reference axis Y of the gripper 3 decentered with respect to the first reference axis X. Consequently, the workpiece W1 advances in the direction of the second reference axis Y, while rotating about the second reference axis Y. Since the second reference axis Y, the axis M, and the axis N are aligned in a straight line, the workpiece W1 is gradually inserted into the hole H while rotating about the axis N with the axis M coinciding with the axis N, as illustrated in FIG. 21. As a result, the workpiece W1 is smoothly inserted into the hole H.

When the amount of advancement of the coupler 4 in the direction of the first reference axis X from the start of the insertion action reaches a predetermined amount, the controller 130 completes the insertion action. In a case where the workpiece W1 reaches the bottom of the hole H before the insertion action is completed, the buffers 10 are deformed to absorb movement of the gripper 3 and the workpiece W1.

Thereafter, the controller 130 actuates the opening/closing driver 8 to thereby release grip of the workpiece W1 by the fingers 32. In this manner, the controller 130 completes the insertion work of the workpiece W1.

As described above, in the insertion work, the workpiece W1 is inserted into the hole H by rotating the workpiece W1 about the second reference axis Y from the state where the second reference axis Y is tilted with respect to the axis N of the hole H and the workpiece W1 is in point contact with the opening edge of the hole H (hereinafter, such insertion will be referred to as "tilting rotary insertion"). The use of the hand 100 for the insertion work eases tilting rotary insertion of the workpiece W1. Specifically, from the state where the second reference axis Y is tilted with respect to the axis N of the hole H and the workpiece W1 is in point contact with the opening edge of the hole H, the rotator 7 is actuated, that is, the rotation shaft 71 is rotated about the first reference axis X so that the workpiece W1 is gradually inserted into the hole H with the axis M coinciding with the axis N, and in order to enable such insertion, the gripper 3 tilts with respect to the first reference axis X accordingly.

Even in the state where the gripper 3 is tilted with respect to the first reference axis X, the coupler 4 can transfer rotation of the rotation shaft 71 about the first reference axis X to the gripper 3 as rotation about the second reference axis Y. Since the workpiece W1 is inserted into the hole H while rotating about the second reference axis Y, the workpiece W1 is more smoothly inserted into the hole H.

In addition, the straight mover 6 can move the coupler 4 in the direction of the first reference axis X. Thus, without movement of the hand body 2, that is, without movement of the robot arm 120, the workpiece W1 can be inserted into the hole H with the tilt of the workpiece W1 changed accordingly.

Furthermore, since the driving sources of the straight mover 6 and the rotator 7 are the common second motor 61 and the straight mover 6 and the rotator 7 act at the same time, the rotation shaft 71 can easily advance in the direction of the first reference axis X while rotating about the first reference axis X.

Since the hand 100 includes the lock 9, the position of the gripper 3 can be stabilized, as necessary. For example, in bringing the workpiece W1 in point contact with the opening edge of the hole H, the lock 9 locks the coupler 4 so that the position of the workpiece W1 can be thereby stabilized and the position adjustment of the workpiece W1 can be accurately performed.

In the thus-configured hand 100, since the coupler 4 supports the gripper 3 such that the gripper 3 is capable of being decentered and tilted with respect to the first reference axis X, that is, flexibly supports the gripper 3. Thus, even if the workpiece gripped by the gripper 3 is displaced from a desired position, the coupler 4 absorbs the displacement and the workpiece can be placed at the desired position. Accordingly, positioning accuracy required for the hand 100 can be reduced.

This flexible support of the gripper 3 by the hand 100 is not achieved by backlash of components or rigidity of components themselves, but is achieved by the decentering supporter 41 and the tilt supporter 47. In the case of flexibly supporting the gripper 3 by backlash of components or other means, flexibility of the support is determined by circumstances, and thus, design and management are difficult. On the other hand, with the decentering supporter 41 and the tilt supporter 47, flexibility of support of the gripper 3 can be appropriately designed and managed.

In addition, the coupler 4 does not flexibly support the entire hand 100 including the hand body 2, but flexibly supports the gripper 3. That is, as compared to the case where the coupler 4 also supports the hand body 2, the weight of members supported by the coupler 4 is reduced. As a result, inertia (i.e., moment of inertia) of the members supported by the coupler 4 is reduced, and responsiveness in tilting or decentering the gripper 3 with respect to the first reference axis X is enhanced.

Further, to achieve low inertia of the gripper 3, the opening/closing driver 8 that opens and closes the gripper 3 is included in the hand body 2. The coupler 4 includes the transfer 5 that transfers a driving force of the opening/closing driver 8 to the gripper 3 with the second reference axis Y decentered or tilted with respect to the first reference axis X. Specifically, the transfer 5 includes the first coupling 51 including the first ball coupling 52 and the second ball coupling 53. Even in the configuration in which the opening/closing driver 8 is included in the hand body 2 and the coupler 4 supports the gripper 3 such that the gripper 3 is capable of being decentered or tilted, this transfer 5 can open and close the gripper 3 with a driving force of the opening/closing driver 8.

The gripper 3 rotates about the second reference axis Y. Accordingly, the use of the hand 100 eases the work of inserting a workpiece into a hole. That is, in the case of inserting a workpiece into a hole while rotating the workpiece, the workpiece can be smoothly inserted into the hole, as compared to the case of simply inserting the workpiece into the hole without rotation.

To achieve low inertia of the gripper 3, the rotator 7 that rotates the gripper 3 about the second reference axis Y is included in the hand body 2. The coupler 4 transfers a driving force of the rotator 7 to the gripper 3 with the second reference axis Y decentered or tilted with respect to the first reference axis X. Consequently, even in the configuration in which the rotator 7 is included in the hand body 2 and the coupler 4 supports the gripper 3 such that the gripper 3 is capable of being tilted or decentered, the gripper 3 can be rotated with a driving force of the rotator 7.

Since the hand 100 includes the lock 9, the gripper 3 cannot be always decentered or tilted with respect to the first reference axis X, and the lock 9 can prevent decentering and tilting of the gripper 3. The locking of the coupler 4 by the lock 9 can enhance positional accuracy of the gripper 3.

When the lock 9 locks the coupler 4, the second reference axis Y and the first reference axis X are aligned in a straight line. Thus, when rotation around the first reference axis X occurs in the hand body 2, the gripper 3 can be rotated about the second reference axis Y.

Since the hand 100 includes the straight mover 6 that moves the coupler 4 straight in the direction of the first reference axis X, the straight mover 6 is used to perform switching between engagement and disengagement of the first engaging portion 91 and the second engaging portion 92 of the lock 9. That is, it is unnecessary to include an additional driver for switching between engagement and disengagement of the first engaging portion 91 and the second engaging portion 92.

Since the hand 100 includes the buffers 10, if an excessive force in the direction of the first reference axis X is exerted on the gripper 3, the buffers 10 can absorb such a force. As a result, accuracy in controlling the position of the gripper 3 in the direction of the first reference axis X can be reduced.

As described above, the hand 100 includes the hand body 3 in which the predetermined first reference axis X is defined, the gripper 3 in which the predetermined second reference axis Y is defined and which grips a workpiece, and the coupler 4 that couples the gripper 3 to the hand body 2. The coupler 4 includes at least one of the decentering supporter 41 that supports the gripper 3 such that the second reference axis Y is capable of being decentered with respect to the first reference axis X, or the tilt supporter 47 that supports the gripper 3 such that the second reference axis Y is capable of being tilted with respect to the first reference axis X.

With this configuration, the hand 100 grips a workpiece with the gripper 3 in which the second reference axis Y is capable of being decentered or tilted with respect to the first reference axis X. Displacement of the gripper 3 can be absorbed by the decentering supporter 41 or the tilt supporter 47. Thus, even in a case where positional accuracy of the gripper 3 is not relatively high, work by the gripper 3 can be appropriately performed. In addition, since the coupler 4 does not support the entire hand 100 including the hand body 2 such that the hand 100 is capable of being decentered or tilted, but supports the gripper 3 such that the gripper 3 is capable of being decentered or tilted. Accordingly, inertia moment of members supported by the coupler 4 can be reduced. As a result, responsiveness in tilting or decentering the gripper 3 with respect to the first reference axis X can be enhanced.

The coupler 4 includes both the decentering supporter 41 and the tilt supporter 47.

With this configuration, the coupler 4 can absorb both decentering and the angular misalignment of the second reference axis Y with respect to the first reference axis X. That is, the coupler 4 can more flexibly absorb displacement of the gripper 3.

The hand body 2 includes the opening/closing driver 8 that opens and closes the gripper 3. The coupler 4 includes the transfer 5 that transfers a driving force of the opening/ closing driver 8 to the gripper 3. The transfer 5 transfers a driving force of the opening/closing driver 8 to the gripper 3 with the second reference axis Y decentered or tilted with respect to the first reference axis X.

With this configuration, the opening/closing driver 8 that opens and closes the gripper 3 is included in the hand body 2 so that weight reduction of the gripper 3 can be thereby facilitated. In addition, even in the configuration in which the opening/closing driver 8 is included in the hand body 2 and the coupler 4 supports the gripper 3 such that the gripper 3 is capable of being decentered or tilted with respect to the first reference axis X, a driving force of the opening/closing driver 8 can also be appropriately transferred to the gripper 3 through the transfer 5. That is, the disposition of the transfer 5 achieves both driving of the gripper 3 by the opening/closing driver 8 included in the hand body 2 and support of the gripper 3 by the coupler 4 such that the gripper 3 is capable of being decentered or tilted.

Specifically, the gripper 3 includes the base 31, the fingers 32 supported by the base 31, and the operator 33 that causes the fingers 32 to perform an opening/closing action. The opening/closing driver 8 includes the first motor 81 that generates a driving force, and the opening/closing shaft 84 that extends along the first reference axis X serving as a center axis of the opening/closing shaft 84 and is rotated about the first reference axis X by a driving force of the first motor 81. The transfer 5 includes the first coupling 51 that couples the opening/closing shaft 84 and the operator 33 to each other. The coupler 4 includes the tilt supporter 47. The first coupling 51 transfers rotation of the opening/closing shaft 84 to the operator 33 with the second reference axis Y tilted with respect to the first reference axis X.

With this configuration, the opening/closing driver 8 rotates the opening/closing shaft 84 about the first reference axis X. The opening/closing shaft 84 is coupled to the operator 33 of the gripper 3 through the first coupling 51 of the transfer 5. Accordingly, even in the state where the second reference axis Y is tilted with respect to the first reference axis X, rotation of the opening/closing shaft 84 about the first reference axis X is transferred to the operator 33. As a result, the fingers 32 can be appropriately opened and closed.

The coupler 4 further includes the decentering supporter 41. The first coupling 51 transfers rotation of the opening/ closing shaft 84 to the operator 33 with the second reference axis Y decentered with respect to the first reference axis X.

In this configuration, the coupler 4 includes both the decentering supporter 41 and the tilt supporter 47. Even in the state where the second reference axis Y is decentered with respect to the first reference axis X, the first coupling 51 can transfer rotation of the opening/closing shaft 84 to the operator 33. As a result, even in the case where the gripper

3 is decentered and tilted with respect to the first reference axis X, the fingers 32 can be appropriately opened and closed.

Specifically, the gripper 3 includes the base 31, the fingers 32 supported by the base 31, and the operator 33 that causes the fingers 32 to perform an opening/closing action. The opening/closing driver 8 includes the first motor 81 that generates a driving force, and the opening/closing shaft 84 that extends along the first reference axis X serving as a center axis of the opening/closing shaft 84 and is rotated about the first reference axis X by a driving force of the first motor 81. The transfer 5 includes the first coupling 51 that couples the opening/closing shaft 84 and the operator 33 to each other. The coupler 4 includes the decentering supporter 41. The first coupling 51 transfers rotation of the opening/ closing shaft 84 to the operator 33 with the second reference axis Y decentered with respect to the first reference axis X.

With this configuration, the opening/closing driver 8 rotates the opening/closing shaft 84 about the first reference axis X. The opening/closing shaft 84 is coupled to the operator 33 of the gripper 3 through the first coupling 51 of the transfer 5. Accordingly, even in the state where the second reference axis Y is decentered with respect to the first reference axis X, rotation of the opening/closing shaft 84 about the first reference axis X is transferred to the operator 33. As a result, the fingers 32 can be appropriately opened and closed.

The first coupling 51 includes a ball coupling. More specifically, the first coupling 51 includes the first ball coupling 52 and the second ball coupling 53. Each of the first ball coupling 52 and the second ball coupling 53 is a type of a universal coupling.

With this configuration, decentering and the angular misalignment between the first reference axis X and the second reference axis Y can be absorbed by the first ball coupling 52 and the second ball coupling 53. That is, the first ball coupling 52 and the second ball coupling 53 can transfer rotation about the first reference axis X to the gripper 3 as rotation about the second reference axis Y.

The operator 33 includes the links 36 coupled to the fingers 32, the feed screw 37 that extends along the second reference axis Y serving a center axis of the feed screw 37 and rotates about the second reference axis Y, and the block 38 which is screwed to the feed screw 37 and to which the links 36 are coupled. The first coupling 51 couples the opening/closing shaft 84 and the feed screw 37 to each other.

With this configuration, the operator 33 includes the links 36, and is a so-called linkage. The links 36 are actuated by rotation of the feed screw 37, and open and close the fingers 32. The feed screw 37 rotates about the second reference axis Y. The opening/closing shaft 84 is coupled to the feed screw 37 through the first coupling 51. Thus, even in the state where the gripper 3 is decentered or tilted with respect to the first reference axis X, the first coupling 51 can appropriately transfer rotation of the opening/closing shaft 84 to the feed screw 37.

The hand body 2 includes the rotator 7 that rotates the gripper 3 about the second reference axis Y. The coupler 4 is coupled to the rotator 7.

With this configuration, the rotator 7 rotates the coupler 4 to thereby rotate the gripper 3 about the second reference axis Y. The disposition of the rotator 7 in the hand body 2 can facilitate weight reduction of the gripper 3.

The coupler 4 transfers a driving force of the rotator 7 to the gripper 3 with the second reference axis Y decentered or tilted with respect to the first reference axis X.

With this configuration, the gripper 3 can be rotated about the second reference axis Y with the second reference axis Y kept decentered or tilted with respect to the first reference axis X. That is, the coupler 4 allows decentering or angular misalignment between the first reference axis X and the second reference axis Y so that the gripper 3 can rotate about the second reference axis Y. That is, the coupler 4 achieves both rotation of the gripper 3 by the rotator 7 located in the hand body 2 and support of the gripper 3 such that the gripper 3 is capable of being decentered or tilted.

The coupler 4 includes the decentering supporter 41. The decentering supporter 41 includes the rolling elements 43 interposed between the hand body 2 and the gripper 3, and moves the gripper 3 in the direction in which the gripper 3 is decentered with respect to the first reference axis X by rolling of the rolling elements 43.

With this configuration, the gripper 3 can smoothly move in the direction in which the gripper 3 is decentered by rolling of the rolling elements 43.

Specifically, the rotator 7 includes the second motor 61 that generates a driving force, and the rotation shaft 71 that extends along the first reference axis X serving as a center axis of the rotation shaft 71 and is rotated about the first reference axis X by a driving force of the second motor 61. The coupler 4 includes the decentering supporter 41. The decentering supporter 41 includes the second coupling 45 that couples the rotation shaft 71 and the gripper 3 to each other, and transfers rotation of the rotation shaft 71 to the gripper 3 with the second reference axis Y decentered with respect to the first reference axis X.

With this configuration, the rotator 7 rotates the rotation shaft 71 about the first reference axis X. The rotation shaft 71 is coupled to the coupler 4. The second coupling 45 of the coupler 4 transfers rotation of the rotation shaft 71 about the first reference axis X to the gripper 3 even with the second reference axis Y decentered with respect to the first reference axis X. As a result, the gripper 3 can be rotated about the second reference axis Y.

The second coupling 45 is an Oldham coupling.

With this configuration, the second coupling 45 can be easily realized by an Oldham coupling, which is a typical coupling.

Specifically, the rotator 7 includes the second motor 61 that generates a driving force, and the rotation shaft 71 that extends along the first reference axis X serving as a center axis of the rotation shaft 71 and is rotated about the first reference axis X by a driving force of the second motor 61. The coupler 4 includes the tilt supporter 47. The tilt supporter 47 includes the third coupling 48 that couples the rotation shaft 71 and the gripper 3 to each other, and transfers rotation of the rotation shaft 71 to the gripper 3 with the second reference axis Y tilted with respect to the first reference axis X.

With this configuration, the rotator 7 rotates the rotation shaft 71 about the first reference axis X. The rotation shaft 71 is coupled to the coupler 4. The third coupling 48 of the coupler 4 transfers rotation of the rotation shaft 71 about the first reference axis X to the gripper 3 even with the second reference axis Y tilted with the first reference axis X. As a result, the gripper 3 can be rotated about the second reference axis Y.

The third coupling 48 is a universal coupling.

With this configuration, the third coupling 48 can be easily realized by a universal coupling, which is a typical coupling.

The hand 100 further includes the lock 9 that locks movement of the coupler 4.

With this configuration, the lock 9 can lock movement of the coupler 4. That is, the hand 100 can switch the gripper 3 between the state where the gripper 3 is capable of being decentered or tilted and the state where the gripper 3 cannot be decentered and tilted. In the state where the gripper 3 is capable of being decentered or tilted, it is possible to perform work by the gripper 3 while absorbing displacement of the gripper 3. On the other hand, in the state where the gripper 3 cannot be decentered and tilted, work by the gripper 3 can be performed with high positional accuracy.

The lock 9 locks movement of the coupler 4 in the state where the first reference axis X and the second reference axis Y are aligned in a straight line.

With this configuration, in the locked state by the lock 9, control of the position of the hand 100 with reference to the first reference axis X of the hand body 2 involves control of the position of the second reference axis Y of the gripper 3. In the case where a driving force of rotation about the first reference axis X is generated in the locked state by the lock 9, the gripper 3 is rotated with the second reference axis Y and the first reference axis X coinciding with each other.

The hand body 2 includes the straight mover 6 that moves the coupler 4 straight in the direction of the first reference axis X relative to the hand body 2. The lock 9 includes first engaging portion 91 located at the hand body 2, and the second engaging portion 92 located at the gripper 3. The lock 9 locks movement of the coupler 4 by engagement between the first engaging portion 91 and the second engaging portion 92, and releases locking of the movement of the coupler 4 by disengagement between the first engaging portion 91 and the second engaging portion 92. The second engaging portion 92 is switched by straight movement of the coupler 4 by the straight mover 6 between engagement and disengagement of the second engaging portion 92 and the first engaging portion 91.

With this configuration, the lock 9 switches locking of the coupler 4 by engagement and disengagement of the first engaging portion 91 and the second engaging portion 92. On the other hand, the hand body 2 includes the straight mover 6 that moves the coupler 4 (i.e., the gripper 3) straight in the direction of the first reference axis X. The lock 9 uses the straight mover 6 to switch between engagement and disengagement of the first engaging portion 91 and the second engaging portion 92. Thus, it is unnecessary to include an additional driver for actuating the lock 9. As a result, the configuration of the hand 100 can be simplified.

The hand 100 further includes the buffer 10 that absorbs a force exerted on the gripper 3 in the direction of the first reference axis X.

With this configuration, if an excessive force in the direction of the first reference axis X is exerted on the gripper 3, the buffer 10 can absorb such a force. As a result, accuracy in controlling the position of the gripper 3 in the direction of the first reference axis X can be eased.

The gripper 3 includes the base 31, the fingers 32 supported by the base 31, the links 36 coupled to the fingers 32, and the operator 33 that causes the fingers 32 to perform an opening/closing action. The coupler 4 couples the base 31 to the hand body 2.

With this configuration, the function of the hand 100 that enables decentering or tilting of the gripper 3 with respect to the first reference axis X is achieved neither by backlash of components such as the operator 33 and the links 36 nor by rigidity of the components themselves. The hand 100 supports the gripper 3 such that the gripper 3 is capable of being decentered or tilted with respect to the first reference axis X by the coupler 4 between the hand body 2 and the gripper 3.

Accordingly, the hand 100 can appropriately design and manage the mode of decentering or tilting of the gripper 3, independently of circumstances.

The robot system 1000 includes the robot arm 120, the hand 100 coupled to the robot arm 120, and the controller 130 that controls the robot arm 120 and the hand 100. The hand 100 includes the hand body 2 in which the predetermined first reference axis X is defined, the gripper 3 in which the predetermined second reference axis Y is defined and which grips the workpiece W1, and the coupler 4 that couples the gripper 3 to the hand body 2. The coupler 4 includes at least one of the decentering supporter 41 that supports the gripper 3 such that the second reference axis Y is capable of being decentered with respect to the first reference axis X, or the tilt supporter 47 that supports the gripper 3 such that the second reference axis Y is capable of being tilted with respect to the first reference axis X. The controller 130 causes the robot arm 120 and the hand 100 to perform insertion work of inserting the workpiece W1 gripped by the hand 100 into the predetermined hole H.

With this configuration, the insertion work of inserting the workpiece W1 into the hole H is performed by using the hand 100. Since the hand 100 is supported by the coupler 4 including at least one of the decentering supporter 41 or the tilt supporter 47, even if position adjustment of the workpiece W1 to the hole H is not strictly performed, the insertion work of inserting the workpiece W1 into the hole H can be smoothly performed by decentering or tilting of the gripper 3 by the coupler 4 with respect to the first reference axis X.

The controller 130 causes the robot arm 120 and the hand 100 to insert the workpiece W1 gripped by the gripper 3 into the hole H from the state where the second reference axis Y is decentered or tilted with respect to the axis N of the hole H.

With this configuration, the workpiece W1 is inserted into the hole H from a state where the workpiece W1 is relatively displaced from the hole H. In this case, the workpiece W1 is guided by the opening edge of the hole H to be ready for fitting in the hole H. At this time, since the gripper 3 is capable of being decentered or tilted with respect to the first reference axis X, the workpiece W1 is allowed to change its posture to be thereby smoothly fitted in the hole H.

The hand body 2 includes the rotator 7 that is coupled to the coupler 4 and rotates the gripper 3 about the second reference axis Y. The coupler 4 includes the tilt supporter 47, and transfers a driving force of the rotator 7 to the gripper 3 with the second reference axis Y tilted with respect to the first reference axis X. The controller 130 actuates the rotator 7 from a state where the workpiece W1 gripped by the gripper 3 is in point contact with the opening edge of the hole H and the second reference axis Y is tilted with respect to the axis N of the hole H to thereby insert the workpiece W1 into the hole H.

With this configuration, tilting rotary insertion is performed such that the workpiece W1 is inserted into the hole H by rotating the workpiece W1 about the second reference axis Y from the state where the first reference axis X and the second reference axis Y are tilted with respect to the axis N of the hole H and the workpiece W1 is in point contact with the opening edge of the hole H. In the tilting rotary insertion, the workpiece W1 is guided by the opening edge of the hole H and is smoothly introduced into the hole H. The coupler 4 can transfer a driving force of the rotator 7 to the gripper 3 with the second reference axis Y tilted with respect to the first reference axis X, while supporting the gripper 3 such that the gripper 3 is capable of being tilted with respect to the first reference axis X. Accordingly, the gripper 3 can continue rotation about the second reference axis Y while changing the posture such that the second reference axis Y coincides with the axis N of the hole H in accordance with introduction of the workpiece W1 into the hole H. Such an action of the gripper 3 can be achieved by flexible support of the gripper 3 by the coupler 4 without the need for movement of the hand body 2.

The coupler 4 further includes the decentering supporter 41, and transfers a driving force of the rotator 7 to the gripper 3 with the second reference axis Y decentered with respect to the first reference axis X. The controller 130 causes the robot arm 120 to act such that the first reference axis X is parallel to the axis N of the hole H after the workpiece W1 gripped by the gripper 3 is partially inserted into the hole H, and then actuates the rotator 7 to further insert the workpiece W1 into the hole H.

With this configuration, after the workpiece W1 has been partially inserted into the hole H by tilting rotary insertion, the robot arm 120 moves such that the first reference axis X becomes parallel to the axis N of the hole H. Since the workpiece W1 is inserted in the hole H, the second reference axis Y is aligned with the axis N in a straight line. Accordingly, the first reference axis X is aligned with the second reference axis Y in a straight line or is in parallel with the second reference axis Y. The coupler 4 supports the gripper 3 such that the gripper 3 is capable of being decentered with respect to the first reference axis X, and transfers a driving force of the rotator 7 to the gripper 3 with the second reference axis Y decentered with respect to the first reference axis X. Thus, the hand 100 can rotate the gripper 3 about the second reference axis Y by the rotator 7 in the state where the second reference axis Y is aligned with the first reference axis X in a straight line or is decentered with respect to the first reference axis X. Consequently, the workpiece W1 is gradually inserted into the hole H while rotating about the axis N. At this time, since the first reference axis X is aligned with the axis N in a straight line or in parallel with the axis N, as compared to a case where the first reference axis X is tilted with respect to the axis N, galling of the workpiece W1 with the hole H can be reduced. As a result, the workpiece W1 can be smoothly inserted into the hole H.

The hand 100 further includes the lock 9 that locks movement of the tilt supporter 47. The controller 130 causes the robot arm 120 to act such that the workpiece W1 gripped by the gripper 3 is brought into point contact with the opening edge of the hole H in the state where the tilt supporter 47 is locked by the lock 9 and the second reference axis Y is tilted with respect to the axis N of the hole H, and actuates the rotator 7 in the state where locking of the tilt supporter 47 by the lock 9 is released to thereby insert the workpiece W1 into the hole H.

With this configuration, the lock 9 locks an action of the tilt supporter 47 such that the gripper 3 cannot tilt with respect to the first reference axis X. Accordingly, the action of bringing the workpiece W1 into point contact with the opening edge of the hole H with the second reference axis Y tilted with respect to the axis N of the hole H can be achieved with high positional accuracy. In starting insertion of the workpiece W1 into the hole H, locking of the tilt supporter 47 by the lock 9 is released so that smooth insertion of the workpiece W1 into the hole H as described above is thereby enabled.

Other Embodiments

In the foregoing section, the embodiment has been described as an example of the technique disclosed in the present application. The technique disclosed here, however, is not limited to this embodiment, and is applicable to other embodiments obtained by changes, replacements, additions, and/or omissions as necessary. Components described in the above embodiment may be combined as a new exemplary embodiment. Components provided in the accompanying drawings and the detailed description can include components unnecessary for solving problems as well as components necessary for solving problems in order to exemplify the technique. Therefore, it should not be concluded that such unnecessary components are necessary only because these unnecessary components are included in the accompanying drawings or the detailed description.

For example, the hand 100 may not be coupled to the robot arm 120. The hand 100 may be applied not only to the robot 110 but also to dedicated machines and the like.

The work performed by the hand 100 is not limited to insertion work. The work of the hand 100 may be work such as the work of simply picking components or the work of placing components at a predetermined place.

The insertion work may be not only simple insertion of the workpiece W1 into the hole H but also work such as press fitting of the workpiece W1 into the hole H or screwing of the workpiece W1 into a screw hole. The insertion work is not limited to tilting rotary insertion. Specifically, in inserting the workpiece W1 into the hole H, the workpiece W1 may be inserted into the hole H from a state where the second reference axis Y and the axis N of the hole H are arranged in parallel or aligned in a straight line. Alternatively, in inserting the workpiece W1 into the hole H, the workpiece W1 may be inserted into the hole H from a state where the workpiece W1 is in contact with the opening edge of the hole H at a line or at multiple points.

In the insertion work described above, the robot system 1000 performs the introduction action of introducing the workpiece W1 into the hole H by tilting rotary insertion, and then, in the state where the first reference axis X is made parallel to the axis N of the hole H, further performs the insertion action. However, the present disclosure is not limited to this example. For example, after the introduction action, insertion of the workpiece W1 into the hole H may be continued with the first reference axis X kept tilted with respect to the axis N of the hole H.

Alternatively, the insertion work may be the work of inserting a workpiece into a hole whose axis extends horizontally. In this case, the lock 9 is especially effective. Specifically, the hand 100 is in the posture in which the first reference axis X extends substantially horizontally. As compared to a case where the first reference axis X extends substantially vertically, the gripper 3 is easily decentered or tilted with respect to the first reference axis X by self weight and a load of the workpiece. Decentering and tilt of the gripper 3 are restricted by locking movement of the coupler 4 by the lock 9. Accordingly, position adjustment of the workpiece can be performed with high accuracy.

In the hand 100, at least one of the straight mover 6 or the rotator 7 may be omitted. For example, the robot arm 120 may move the entire hand 100 straight in the direction of the first reference axis X or rotate the entire hand 100 about the first reference axis X.

It is sufficient for the coupler 4 to cause the second reference axis Y of the gripper 3 to be decentered or tilted with respect to the first reference axis X. That is, the coupler 4 only needs to enable one of decentering and tilting of the gripper 3.

A mechanism for decentering the second reference axis Y of the gripper 3 with respect to the first reference axis X is not limited to the configuration of the decentering supporter 41. For example, the decentering supporter 41 may include the second coupling 45, the decentered body 42 or may include the rolling elements 43 and the first disc 71c.

The second coupling 45 is not limited to an Oldham coupling. The second coupling 45 only needs to be a coupling that transfers rotation between two decentered axes. For example, the second coupling 45 may be a Schmidt coupling, or a pin coupling in which a pin attached to a disc on one axis is fitted in a round hole in a disc on another axis to thereby transfer rotation.

The third coupling 48 is not limited to a universal coupling. The third coupling 48 only needs to be a coupling that transfers rotation between two tilted axes (i.e., two axes with angular misalignment). For example, the third coupling 48 may be a flexible coupling, a torque coil, or a ball joint.

The operator 33 of the gripper 3 is not limited to the linkage. The operator 33 only needs to be a mechanism that is driven by rotation of the opening/closing shaft 84 to open and close the fingers 32. For example, the operator 33 may be a mechanism that opens and closes the fingers 32 by a slider technique or a rack and pinion technique.

The first coupling 51 is not limited to the first ball coupling 52 and the second ball coupling 53. The first coupling 51 only needs to be a coupling that transfers rotation between two decentered or tilted axes. For example, the first coupling 51 may be one or more universal couplings, flexible couplings, torque coils, ball joints, Oldham couplings, Schmidt couplings, or pin couplings.

The hand 100 may not include the lock 9. The lock 9 is not limited to the configuration described above. The first engaging portion 91 and the second engaging portion 92 only need to be configured to be engaged with each other, and are not limited to tubular shapes. Switching between engagement and disengagement of the first engaging portion 91 and the second engaging portion 92 is not necessarily performed by the straight mover 6, and may be performed by another driver. Alternatively, the lock 9 may lock movement of the coupler 4 by pushing the gripper 3 against another component such as the hand body 2.

Functions of elements disclosed herein may be performed by using a circuit or a processing circuit including a general-purpose processor, a dedicated processor, an integrated circuit, an application specific integrated circuit (ASIC) configured or programmed to perform disclosed functions, a conventional circuit, and/or a combination thereof. A processor includes a transistor and other circuits, and thus, are assumed to be a processing circuit or a circuit. In the present disclosure, a circuit, a unit, or a means is hardware that performs listed functions, or hardware programmed to perform listed functions. The hardware may be the hardware disclosed herein, or known hardware programmed or configured to perform listed functions. If the hardware is a processor considered as a type of a circuit, the circuit, the means, or the unit is a combination of hardware and software, and software is used for a configuration of hardware and/or a processor.

The invention claimed is:

1. A hand comprising:
    a hand body in which a predetermined first reference axis is defined;
    a gripper in which a predetermined second reference axis is defined and which grips a workpiece; and
    a coupler that couples the gripper to the hand body, wherein
    the coupler includes at least one of a decentering supporter that supports the gripper such that the second reference axis is capable of being freely decentered with respect to the first reference axis, or a tilt supporter that supports the gripper such that the second reference axis is capable of being freely tilted with respect to the first reference axis.

2. The hand according to claim 1, wherein
the coupler includes both the decentering supporter and the tilt supporter.

3. The hand according to claim 1, wherein
the hand body includes an opening/closing driver that opens and closes the gripper,
the coupler includes a transfer that transfers a driving force of the opening/closing driver to the gripper, and
the transfer transfers a driving force of the opening/closing driver to the gripper with the second reference axis decentered or tilted with respect to the first reference axis.

4. The hand according to claim 3, wherein
the gripper includes a base, fingers supported by the base, and an operator that causes the fingers to perform an opening/closing action,
the opening/closing driver includes an opening/closing driving source that generates a driving force, and an opening/closing shaft that extends along the first reference axis serving as a center axis of the opening/closing shaft and is rotated about the first reference axis by a driving force of the opening/closing driving source,
the transfer includes a first coupling that couples the opening/closing shaft and the operator to each other,
the coupler includes the decentering supporter, and
the first coupling transfers rotation of the opening/closing shaft to the operator with the second reference axis decentered with respect to the first reference axis.

5. The hand according to claim 3, wherein
the gripper includes a base, fingers supported by the base, and an operator that causes the fingers to perform an opening/closing action,
the opening/closing driver includes an opening/closing driving source that generates a driving force, and an opening/closing shaft that extends along the first reference axis serving as a center axis of the opening/closing shaft and is rotated about the first reference axis by a driving force of the opening/closing driving source,
the transfer includes a first coupling that couples the opening/closing shaft and the operator to each other,
the coupler includes the tilt supporter, and
the first coupling transfers rotation of the opening/closing shaft to the operator with the second reference axis tilted with respect to the first reference axis.

6. The hand according to claim 5, wherein
the coupler further includes the decentering supporter, and
the first coupling transfers rotation of the opening/closing shaft to the operator with the second reference axis decentered with respect to the first reference axis.

7. The hand according to claim 5, wherein
the first coupling includes a universal coupling, a flexible coupling, a torque coil, a ball coupling, or a ball joint.

8. The hand according to claim 5, wherein
the operator includes links coupled to the fingers, a feed screw that extends along the second reference axis serving as a center axis of the feed screw and rotates about the second reference axis, and a block which is screwed to the feed screw and to which the links are coupled, and the first coupling couples the opening/closing shaft and the feed screw to each other.

9. The hand according to claim 1, wherein
the hand body includes a rotator that rotates the gripper about the second reference axis, and
the coupler is coupled to the rotator.

10. The hand according to claim 9, wherein
the coupler includes the decentering supporter, and
the decentering supporter includes a rolling element interposed between the hand body and the gripper, and moves the gripper in a direction in which the gripper is decentered with respect to the first reference axis by rolling of the rolling element.

11. The hand according to claim 9, wherein
the coupler transfers a driving force of the rotator to the gripper with the second reference axis decentered or tilted with respect to the first reference axis.

12. The hand according to claim 11, wherein
the rotator includes a rotational driving source that generates a driving force, and a rotation shaft that extends along the first reference axis serving as a center axis of the rotation shaft and is rotated about the first reference axis by a driving force of the rotational driving source,
the coupler includes the decentering supporter, and
the decentering supporter includes a second coupling that couples the rotation shaft and the gripper to each other, and transfers rotation of the rotation shaft to the gripper with the second reference axis decentered with respect to the first reference axis.

13. The hand according to claim 12, wherein the second coupling includes an Oldham coupling, a Schmidt coupling, or a pin coupling.

14. The hand according to claim 11, wherein
the rotator includes a rotational driving source that generates a driving force, and a rotation shaft that extends along the first reference axis serving as a center axis of the rotation shaft and is rotated about the first reference axis by a driving force of the rotational driving source,
the coupler includes the tilt supporter, and
the tilt supporter includes a third coupling that couples the rotation shaft and the gripper to each other, and transfers rotation of the rotation shaft to the gripper with the second reference axis tilted with respect to the first reference axis.

15. The hand according to claim 14, wherein the third coupling is a universal coupling, a flexible coupling, a torque coil, or a ball joint.

16. The hand according to claim 1, further comprising a lock that switches between a lock state where the lock locks movement of the coupler and a release state where the coupler is freely movable.

17. The hand according to claim 16, wherein the lock locks movement of the coupler with the first reference axis and the second reference axis aligned in a straight line.

18. The hand according to claim 16, wherein
the hand body includes a straight mover that moves the gripper straight in a direction of the first reference axis relative to the hand body,
the lock includes a first engaging portion located at the hand body and a second engaging portion located at the gripper, locks movement of the coupler by engagement between the first engaging portion and the second engaging portion, and releases locking of the movement of the coupler by disengagement between the first engaging portion and the second engaging portion, and
the second engaging portion is switched by straight movement of the gripper by the straight mover between engagement and disengagement between the second engaging portion and the first engaging portion.

19. The hand according to claim 1, further comprising a buffer that absorbs a force exerted on the gripper in a direction of the first reference axis.

20. The hand according to claim 1, wherein
the gripper includes a base, fingers supported by the base, links coupled to the fingers, and an operator that causes the fingers to perform an opening/closing action, and
the coupler couples the base to the hand body.

21. The hand according to claim 1, wherein
the gripper includes a base in which the second reference axis is defined, and fingers supported by the base,
the decentering supporter supports the base, and
the tilt supporter supports the base.

22. A robot system comprising:
a robot arm;
a hand coupled to the robot arm; and
a controller that controls the robot arm and the hand, wherein
the hand includes
    a hand body in which a predetermined first reference axis is defined,
    a gripper in which a predetermined second reference axis is defined and which grips a workpiece, and
    a coupler that couples the gripper to the hand body,
the coupler includes at least one of a decentering supporter that supports the gripper such that the second reference axis is capable of being freely decentered with respect to the first reference axis, or a tilt supporter that supports the gripper such that the second reference axis is capable of being freely tilted with respect to the first reference axis, and
the controller causes the robot arm and the hand to perform insertion work of inserting the workpiece gripped by the hand into a predetermined hole.

23. The robot system according to claim 22, wherein
the controller causes the robot arm and the hand to insert the workpiece gripped by the gripper into the hole from a state where the second reference axis is decentered or tilted with respect to an axis of the hole.

24. The robot system according to claim 23, wherein
the hand body includes a rotator that is coupled to the coupler and rotates the gripper about the second reference axis,
the coupler includes the tilt supporter, and transfers a driving force of the rotator to the gripper with the second reference axis tilted with respect to the first reference axis, and
the controller actuates the rotator from a state where the workpiece gripped by the gripper is in point contact with an opening edge of the hole and the second reference axis is tilted with respect to the axis of the hole to thereby insert the workpiece into the hole.

25. The robot system according to claim 24, wherein
the coupler further includes the decentering supporter, and transfers a driving force of the rotator to the gripper with the second reference axis decentered with respect to the first reference axis, and
the controller causes the robot arm to act such that the first reference axis is parallel to the axis of the hole after the workpiece gripped by the gripper is partially inserted into the hole, and then actuates the rotator to further insert the workpiece into the hole.

26. The robot system according to claim 24, wherein
the hand further includes a lock that locks movement of the tilt supporter, and the controller
causes the robot arm to act such that the workpiece gripped by the gripper is brought into point contact with an opening edge of the hole in a state where the tilt supporter is locked by the lock and the second reference axis is tilted with respect to the axis of the hole, and
actuates the rotator in a state where locking of the tilt supporter by the lock is released to thereby insert the workpiece into the hole.

\* \* \* \* \*